US011870263B2

(12) United States Patent
Griffith et al.

(10) Patent No.: US 11,870,263 B2
(45) Date of Patent: Jan. 9, 2024

(54) APPLIANCE LEVEL BATTERY-BASED ENERGY STORAGE

(71) Applicant: Channing Street Copper Company, Berkeley, CA (US)

(72) Inventors: Saul Thomas Griffith, San Francisco, CA (US); Samuel Eli Calisch, Berkeley, CA (US); Joshua Land, San Francisco, CA (US); Tucker Gilman, Berkeley, CA (US)

(73) Assignee: CHANNING STREET COPPER COMPANY, Berkeley, CA (US)

( * ) Notice: Subject to any disclaimer, the term of this patent is extended or adjusted under 35 U.S.C. 154(b) by 19 days.

(21) Appl. No.: 17/692,714

(22) Filed: Mar. 11, 2022

(65) Prior Publication Data

US 2022/0344941 A1    Oct. 27, 2022

Related U.S. Application Data

(60) Provisional application No. 63/159,851, filed on Mar. 11, 2021.

(51) Int. Cl.
*H02J 3/32* (2006.01)
*H02J 7/00* (2006.01)
*H02J 7/34* (2006.01)
*H01M 50/251* (2021.01)
*H01M 50/204* (2021.01)
(Continued)

(52) U.S. Cl.
CPC .......... *H02J 3/32* (2013.01); *H01M 10/4207* (2013.01); *H01M 50/204* (2021.01); *H01M 50/251* (2021.01); *H02J 3/381* (2013.01); *H02J 7/0013* (2013.01); *H02J 7/00032* (2020.01);
(Continued)

(58) Field of Classification Search
CPC .......... H02J 3/32; H02J 3/381; H02J 7/00032; H02J 7/0013; H02J 7/0063; H02J 7/342; H02J 2300/24; H02J 2310/56; H02J 3/14; H02J 13/00001; H02J 2310/12; H01M 10/4207; H01M 50/204; H01M 50/251; H01M 2220/10
See application file for complete search history.

(56) References Cited

U.S. PATENT DOCUMENTS 7,266,962 B2 * 9/2007 Montuoro ............... F25B 49/02
307/64
2011/0204720 A1 * 8/2011 Ruiz ..................... B60L 53/305
307/66
(Continued)

FOREIGN PATENT DOCUMENTS

KR        102215977 B1    2/2021
WO      2007078403 A2    7/2007

OTHER PUBLICATIONS

International Search Report and Written Opinion dated Jun. 29, 2022, Patent Application No. PCT/US2022/019997, 9 pages.

*Primary Examiner* — Lincoln D Donovan
*Assistant Examiner* — Alex W Lam
(74) *Attorney, Agent, or Firm* — Davis Wright Tremaine LLP

(57) ABSTRACT

A powered building system that includes an electric power distribution system configured to distribute electrical power to a plurality of receptacles; one or more load sources; and one or more battery systems associated with: a respective receptacle of the plurality of receptacles and a respective load source of the one or more load sources.

17 Claims, 24 Drawing Sheets

(51) Int. Cl.
*H01M 10/42* (2006.01)
*H02J 3/38* (2006.01)

(52) U.S. Cl.
CPC ............ *H02J 7/0063* (2013.01); *H02J 7/342* (2020.01); *H01M 2220/10* (2013.01); *H02J 2300/24* (2020.01)

(56) References Cited

U.S. PATENT DOCUMENTS

2011/0316341 A1 12/2011 Pichkur
2012/0110925 A1 5/2012 Weber
2019/0018473 A1 1/2019 Scalf et al.

* cited by examiner

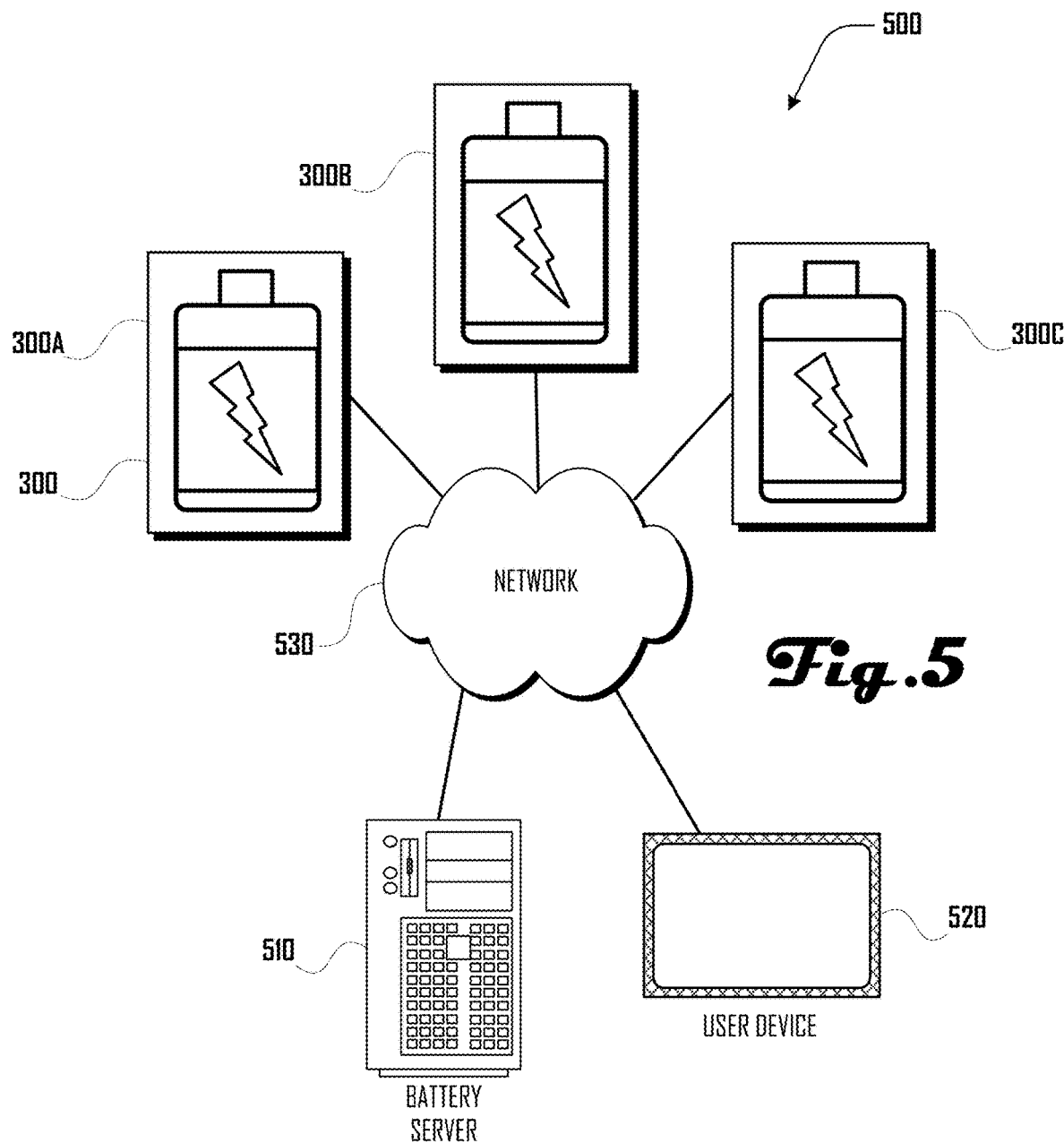

APPLIANCE LEVEL BATTERY-BASED ENERGY STORAGE

CROSS-REFERENCE TO RELATED APPLICATIONS

This application is a non-provisional of and claims the benefit of U.S. Provisional Application No. 63/159,851, filed Mar. 11, 2021, entitled "APPLIANCE LEVEL BATTERY-BASED ENERGY STORAGE,". This application is hereby incorporated herein by reference in its entirety and for all purposes.

STATEMENT REGARDING FEDERALLY SPONSORED RESEARCH

This invention was made with Government support under contract number DE-EE0009698 awarded by DOE, Office of Energy Efficiency & Renewable Energy. The Government has certain rights in this invention.

BACKGROUND

In 2019, the average U.S. home used 25 kWh of electricity per day, or roughly 10,000 kWh per year. Under the deep electrification scenario necessary for total decarbonization (including electrifying all space and water heat, vehicles, and cooking), this residential electricity use will roughly double. As costs of renewables continue to plummet, the question of their dominance is no longer one of cost, but rather of reliability. The key challenge is balancing the time-variable supply with the time-variable loads so that no home is without power when it needs it. This issue is clearly demonstrated in the infamous "duck curve," showing times in the day when available solar resources are larger than demand, and times when demand outstrips supply. It is now widely acknowledged that significant amounts of energy storage are necessary to enable penetration of renewable generation past 80%. Projecting forward the levelized costs of storage technologies, lithium ion batteries are expected to play a dominant role in storage applications, being the most cost effective option for all but the longest-duration seasonal and multiyear storage, and the sub-second storage required for grid stabilization.

The hardware costs of these lithium battery packs continue to plummet (and continue to exceed expectations for the rate of reduction), with costs of $137/kWh in 2020 (a 10× reduction in 10 years) and credible predictions now implying costs of $100/kWh by just 2023. These prices are realized in battery electric vehicles (BEVs), where production scaling and factory installation have driven the prices down so low. The battery cells make up about 80% of the cost, while the remainder is attributable to pack hardware (battery management system, cell interconnect and isolation, and packaging).

Despite these reductions for BEV packs, the costs of stationary battery storage have not fallen nearly as fast or as far. The Tesla powerwall includes 13.5 kWh of storage capacity, and costs about $8,000 for the hardware alone, for a normalized cost of about $600/kWh—not including the significant installation costs. If a house already has appropriate electrical service, this could be as little as $2,000, but if upgrades are required it can cost significantly more, with $7,000 being a representative number. This brings the total installed cost of storage to approximately $750-$1,100 per kWh, an order of magnitude higher than the pack costs of Evs. The installed prices of LG's 9.3 kWh RESU residential storage unit are even higher, with quoted figures of $1,000-$1,400 per kWh. Units from Enphase and Sonnen both come in at $1000/kWh, not including installation.

Even in a utility scale context, the installed costs are considerably higher than the BEV prices. In their 2020 Grid Energy Storage Technology Cost and Performance Assessment, PNNL found that grid installations of roughly 10 MWh capacity cost about $400/kWh in 2020, and were expected to stay around $300/kWh through 2030. Underlying hardware costs made up roughly one third of these costs, with the balance devoted to grid integration, controls and communication, supporting power equipment, and development/installation.

This market context puts lithium ion storage on a similar track as solar photovoltaics, where module hardware costs fell so far that further improvements ceased to meaningfully change the cost of delivered electricity. Instead, improvements to manufacturing and integration hardware, as well as to the costs of installation and permitting ("soft costs") became far more impactful. In 2018, NREL calculated that the average installed cost of residential PV was $2.70/W, but the hardware costs were <$1/W (with PV module cost just $0.30/W). The soft costs of solar installations became the dominant driver, and programs like the DOE's SUNSHOT and SETO have focused efforts there. By analogy, to reduce the cost of installed stationary storage capacity, the supporting (non-cell) hardware costs and soft costs of battery storage must be addressed aggressively.

BRIEF DESCRIPTION OF THE DRAWINGS

FIG. 3a illustrates an example of a stove load source that comprises a battery system that can be an internal component of the stove, an integral component of the stove, disposed within a housing of the stove, or the like.

FIG. 5 illustrates an example embodiment of a battery network that comprises three battery systems, a battery server and a user device, which are operably connected via a network.

FIG. 11 illustrates and example of a battery system block that comprises a plurality of battery systems that can be coupled with a plurality of load sources, with the battery systems having various suitable form factors that allow the battery systems to couple with load sources having different shapes, sizes and forms such as a heat pump, electric stove, refrigerator, water heater, and the like.

Figure 1:
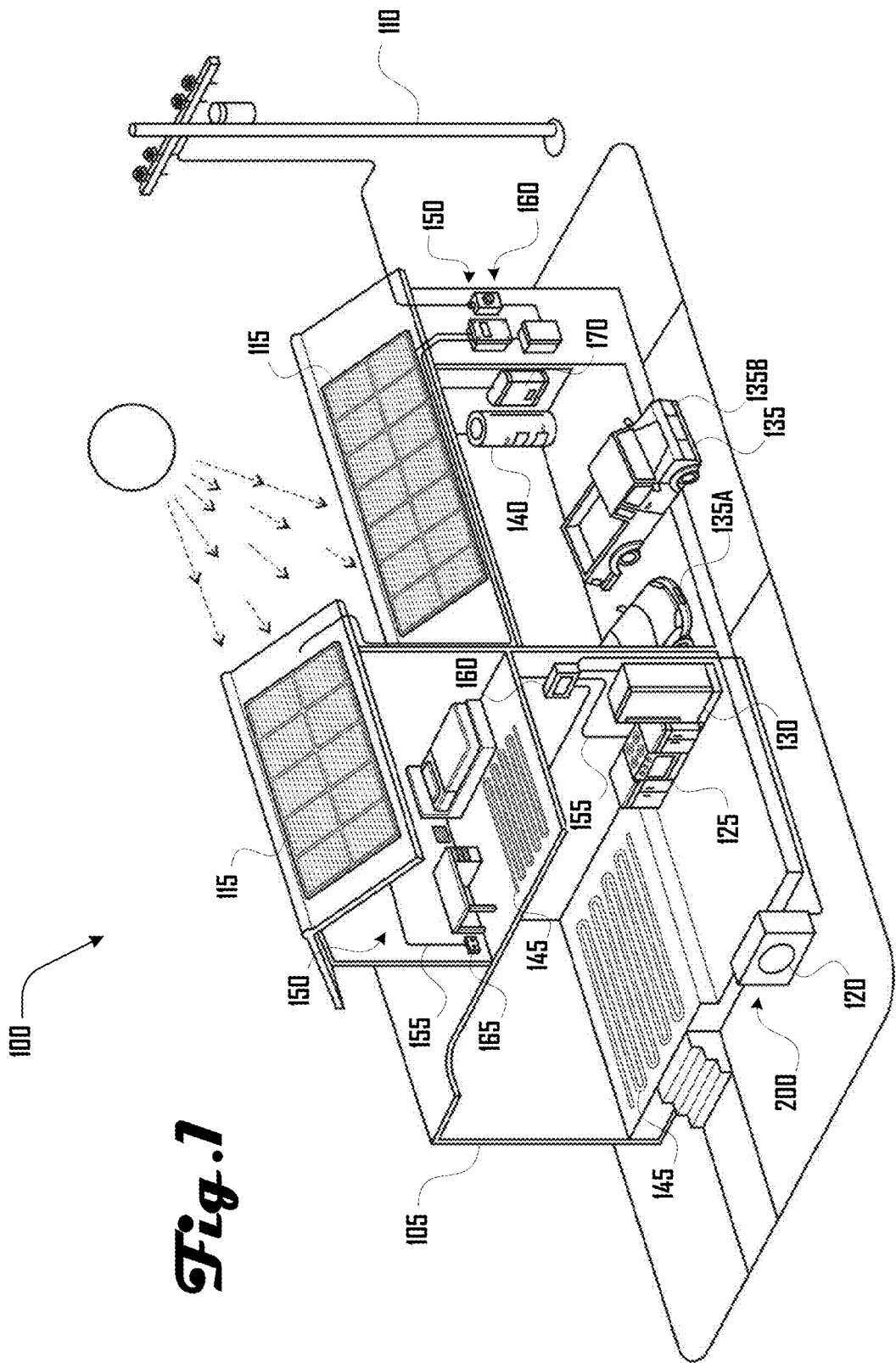
FIG. 1 illustrates an example of a powered building system that comprises a building, which can obtain electrical power from various suitable sources such as an electrical grid, one or more solar panels, and/or battery systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

The present disclosure discusses embodiments of a system that pushes battery storage from centralized installations in the home out to the points of load (the "edges," by analogy with edge computing). In such a distributed model of energy storage, appliances can be equipped with on-board batteries and can do the work of self-managing their demands on the home and utility grid. Some embodiments of a battery system can be built into the home itself. This can enable in various embodiments storage behind various suitable appliances or other load sources without integrating the battery into the appliance or load source itself. The battery device may be installed behind the wall plug itself, or in front of the plug as an intermediary between appliance and wall outlet.

Having multiple appliances with batteries throughout the home in various examples provides the ability for the batteries and appliances to communicate power usage to one another. For example, if Appliance One is fully charged, or close to fully charged, and it is desirable for Appliance Two to take up a portion of the electrical load by powering on, Appliance One can be queried to determine if that is possible without disrupting or overloading the circuit.

Refrigerators, induction stoves, hot water heaters, and laundry machines are specific definitions of appliances that can be equipped with battery storage systems in some examples, but not the only ones. Power tools can be equipped with such battery storage technology and battery management intelligence to balance how and when electricity is pulled from the grid. In some embodiments of a (e.g., fully) connected household where the batteries are connected behind the plug, this can be done down to a micro scale, optimizing the entire home's power usage. Such systems can have various benefits in some embodiments, including one or more benefit as discussed in detail below.

For example, FIG. 1 illustrates an example of a powered building system 100 that comprises a building 105, which can obtain electrical power from various suitable sources such as an electrical power grid 110, one or more solar panels 115, and the like. Such electrical power can power to various suitable load sources 200 (e.g., appliances, elements, systems, vehicles, and the like), such as a heat pump 120, electric stove 125, refrigerator 130, electric vehicles 135, water heater 140, electrical floor heating elements 145, and the like. Power can be distributed to or among such load sources 200 via an electric power distribution system 150 that can comprise power lines 155, electrical sub-elements 160 that provide power to electric receptacles 165, or the like.

As discussed in more detail herein, in various embodiments load sources 200 can be respectively associated with a battery 305 and/or battery system 300 (See e.g., FIGS. 3a, 3b and 3c); however, in some embodiments, the powered building system 100 can comprise one or more building system battery 170 that is not directly associated with a specific load sources 200, and can be configured to store energy for the powered building system 100 generally for distribution to the electrical power grid 110, to the load sources 200 associated with the powered building system 100, or the like. In some embodiments a building system battery 170 can be absent.

Figure 2:
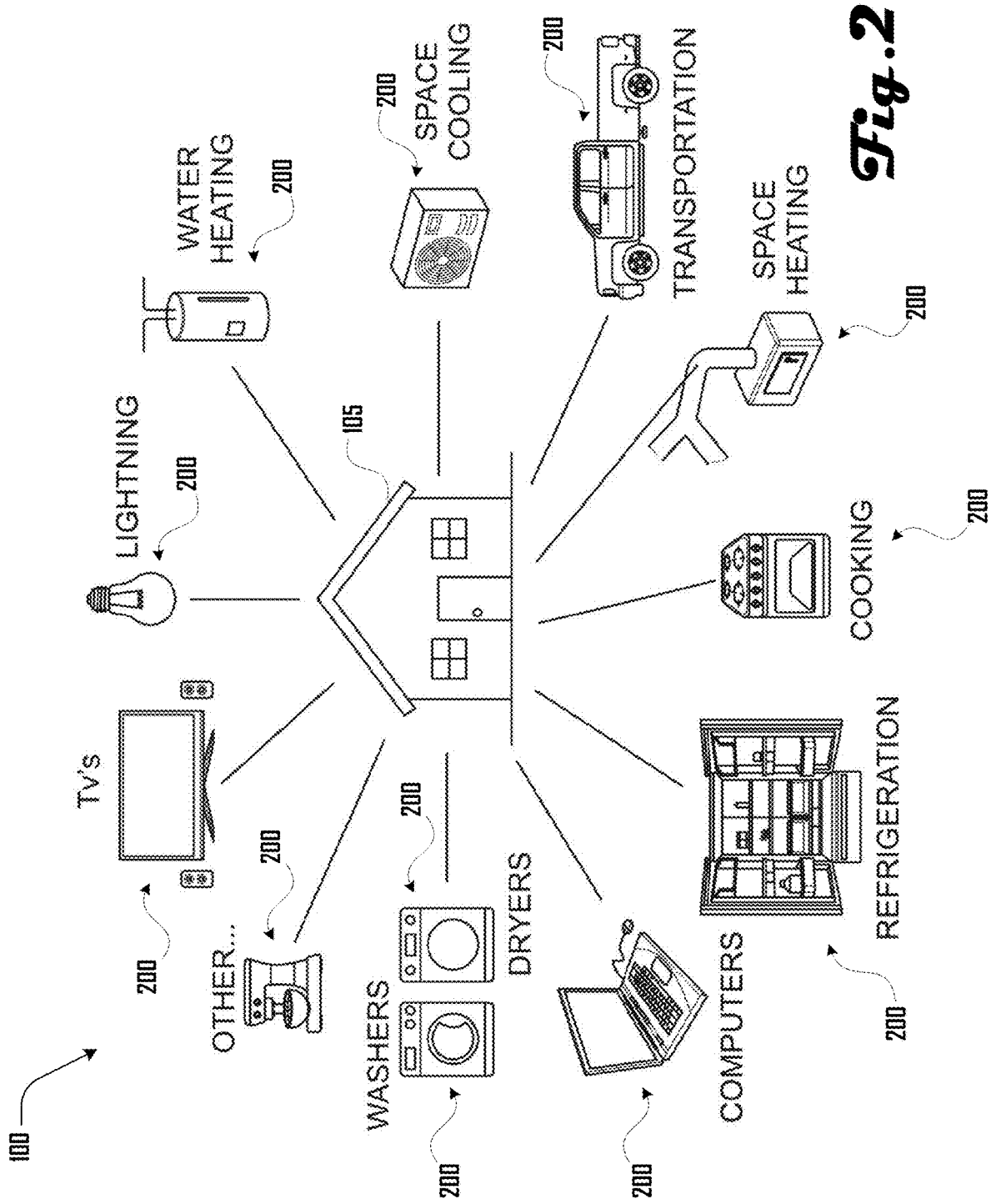
FIG. 2 illustrates examples of load sources that can be associated with a powered building system in an embodiment.

While FIG. 1 illustrates one example embodiment of a powered building system 100, such an embodiment should not be construed to be limiting on the wide variety of load sources 200 that can be powered, associated with a battery and/or battery system, or the like. For example, FIG. 2 illustrates further examples of load sources 200 that can be associated with the powered building system 100 in further embodiments. Additionally, while various embodiments of a powered building system 100 can relate to a single-family residential home, it should be clear that further embodiments can relate to multi-family residences, mixed-use buildings, commercial buildings, factories, airports, farms, or other suitable building, structure, or land. Additionally, some embodiments can be applicable to vehicles or structures such as a cruise ship, offshore platform, airplane, bus, or the like.

Also, while the example of FIG. 1 illustrates a powered building system 100 associated with an electrical power grid 110, such as regional electrical power provider that provides power to a plurality of buildings 105 and/or powered building systems 100, in further embodiments a powered building system 100 may not be associated with or connected to an electrical power grid 110. Additionally, while the example of FIG. 1 illustrates a powered building system 100 that obtains electrical power from one or more solar panels, in further embodiments any suitable additional or alternative electrical power generation systems and methods can be part of a powered building system 100, such as a wind turbine, water turbine, geothermal power generator, nuclear power system, chemical or combustion power generator, or the like.

First, such an approach can place energy storage into homes more cost effectively than the status quo. As the order-of-magnitude discrepancy between EV and home battery prices demonstrates, factory installation of batteries in appliances rather than homes can be significantly less expensive, as no inspections or custom electrical work may be required. As a homeowner replaces appliances at end-of-life, additional storage capacity enters the home by default along with the new appliance, which may require no customizations or electrical work in various embodiments. In this way, in various examples, homes can naturally gain the ability to shift demand and meet a greater portion of their energy needs using renewables via a standard technological upgrade cycle—for example, at no point does the homeowner need to opt to buy a $10,000 home battery, nor do they need to hire an electrician to come install it.

Further, various embodiments of such an approach can eliminate significant upgrade costs required to replace fossil fuel appliances. Many electric appliances (e.g., induction ranges and electric dryers) require dedicated high capacity circuits to be installed, but only draw their full capacity for short periods of time. This electrical work can significantly increase the cost of such an upgrade, providing a large barrier to entry, and can negate any value proposition the increased efficiency of these more advanced appliances may provide. As an example, a four-burner induction cooktop with oven on its own runs from $1,000-$2,000, and (in the lucky case where an appropriate 240V circuit is already available) can be installed by the homeowner or a general contractor for $150-$200. If this range is replacing a natural gas stove, however, the likelihood that an appropriate, unused circuit is available at the correct location is very low, and the cost to install the required 30-40 amp appliance circuit is roughly $800-1,000, with an additional $380-$460 required if the routing from the circuit breaker to the stove is long or inconvenient. Further, in most cases the available electrical service was designed assuming fossil fuel use, and is insufficient for this large additional circuit. Upgrading the service panel in this situation can add an additional $1,500-$4,000 on top of the project cost, making the total cost of replacing the natural gas stove a factor of 2-6 higher than the underlying new appliance cost.

In various embodiments, appliances with integrated or associated batteries as discussed herein can eliminate the need to upgrade electrical service, as they can supply the required high current during use, while only drawing meager average power from an existing 110 v electrical outlet to recharge. In the case of the induction stove, the overwhelming majority of dinnertime cooking needs can be met by a 0.75-1.5 kWh integrated battery, shown in FIG. 1a, where the modeled dinnertime cooking demands of 3000 homes over the 365 days of the year have been aggregated into a histogram. This battery adds a mere $100-$200 to the appliance cost if installed in the factory at current EV prices, and less as the scale of this industry continues to bring costs down. As a result, the total project cost to the homeowner to eliminate this source of residential emissions remains predictable and low, and the dinnertime cooking loads, which occur largely outside the productive window for solar, can be cost-effectively shifted to be powered by renewables.

Figure 24A:
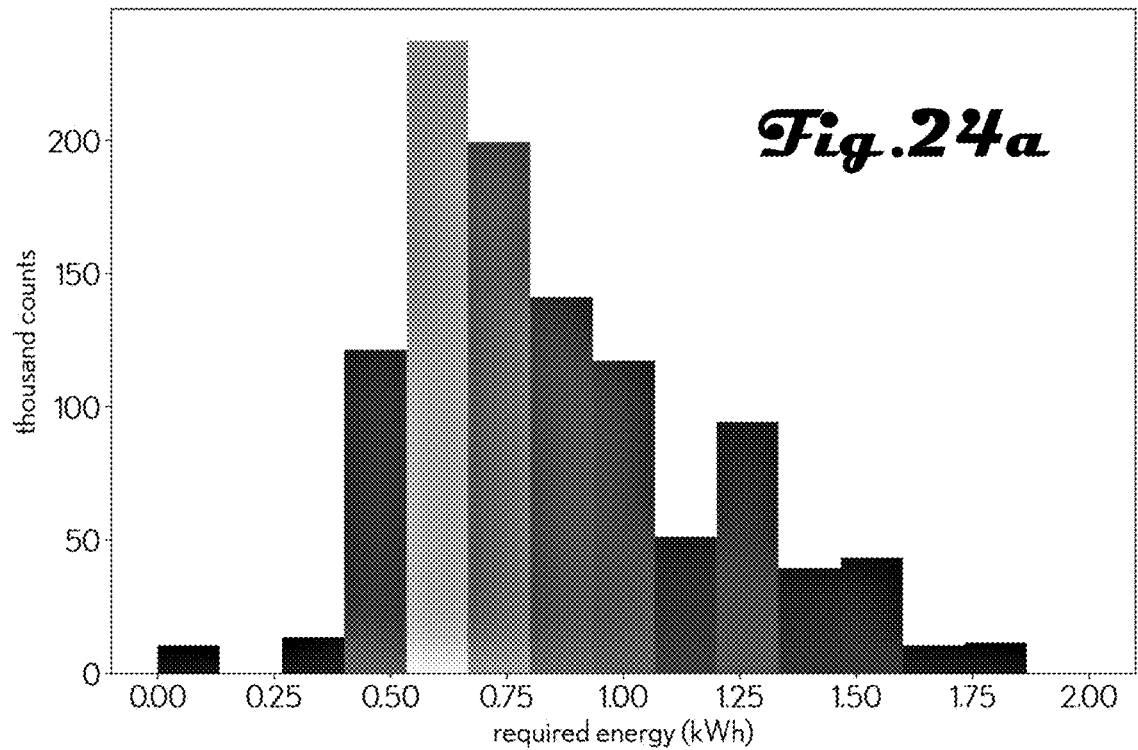
FIG. 24a illustrates a histogram of energy used for cooking dinner over 3000 homes and 365 days of the year, showing battery capacity required to meet this demand.
Figure 24B:
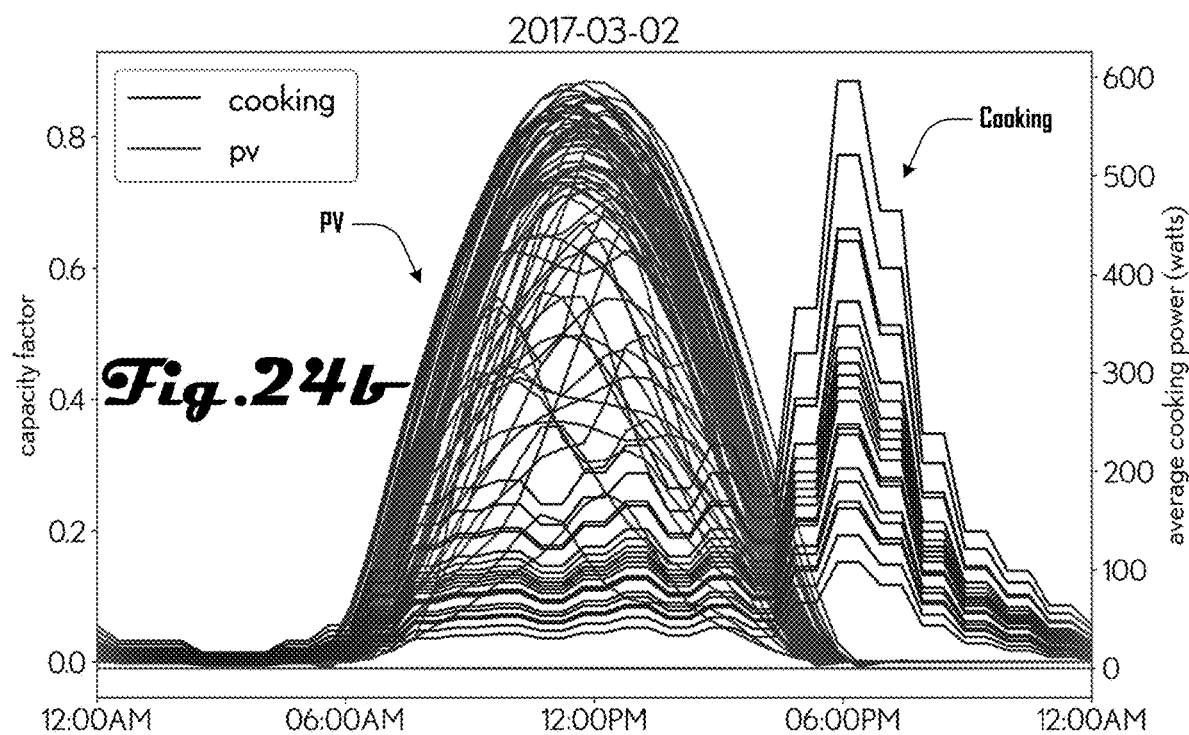
FIG. 24b illustrates PV capacity factor versus cooking loads for a given day, over a population of 109 houses spread across TMY3 locations.

FIGS. 24a and 24b illustrate modeling time-resolved residential solar potential and residential cooking demands. FIG. 24a illustrates a histogram of energy used for cooking dinner over 3000 homes and 365 days of the year, showing battery capacity required to meet this demand and FIG. 24b illustrates PV capacity factor versus cooking loads for a given day, over a population of 109 houses spread across TMY3 locations. The mismatch between supply and demand is illustrated. Drawn from the NASA MERRA-2 dataset, and NREL ResStock models.

Additionally, centralized main home batteries can require large dedicated inverters to supply AC power, even when many appliances (like induction stoves) use internal rectification to convert the power back to DC. Placing batteries at these points of load can allow direct DC powering of the appliance, with only modest AC draw from the electrical outlet in various embodiments. On a systemic level, in various embodiments this can eliminate the inversion-rectification cycle on power drawn and deferred from the grid, and significantly reduce the power requirements on an inverter supplying power from a rooftop solar array. The result can be a reduction in system cost, and an efficiency increase due to eliminated power conversions.

Also, large battery packs that may be required for main home batteries are often spoiled by a single bad cell. In contrast, a ~1 kWh commoditized pack that can be used to power a home appliance can be easier to manage than centralized batteries, and in various embodiments can be made easier to replace in the event of failure. Having fewer cells under a battery management system (BMS) can allow, in some embodiments, better control over charge cycle, mechanical, and thermal stress and more robust health diagnostics, leading to longer battery life. Battery management systems and supporting power electronics can be at a price point such that an increased number of them does not present a cost barrier. As an additional benefit to this approach, in some embodiments smaller battery packs used for point of load storage can be more appropriate for second-life applications of plug-in EV batteries—supply of which is expected to grow rapidly in the next 10 years. Even after use in an EV, such cells are expected to have 70% of their initial capacity and be viable for another 10 years in their second-life application.

Figure 3A:
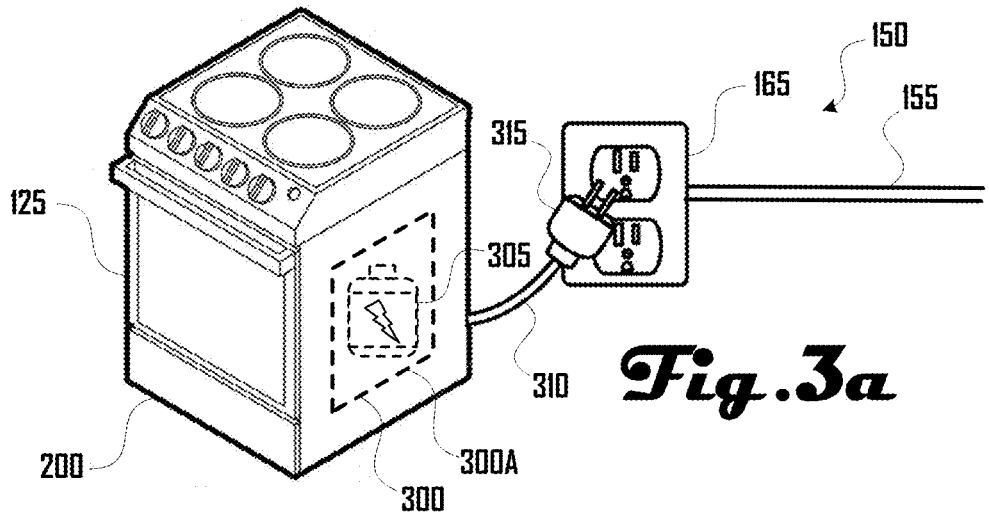
Figure 3B:
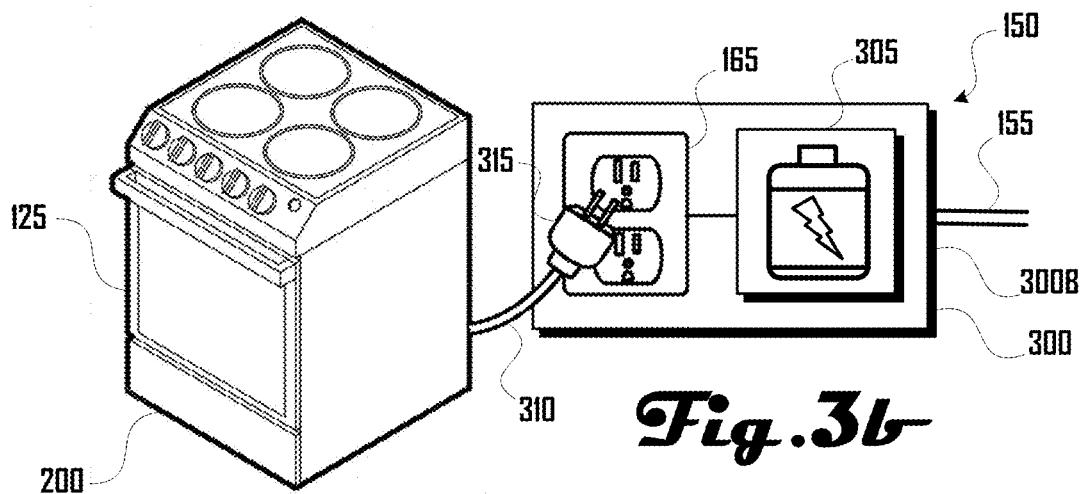
FIG. 3b illustrates another example embodiment of a battery system that can be part of a power distribution system and can be disposed on and/or in a wall of a building and can comprise a receptacle and battery that are configured to receive electrical power from a power line.
Figure 3C:
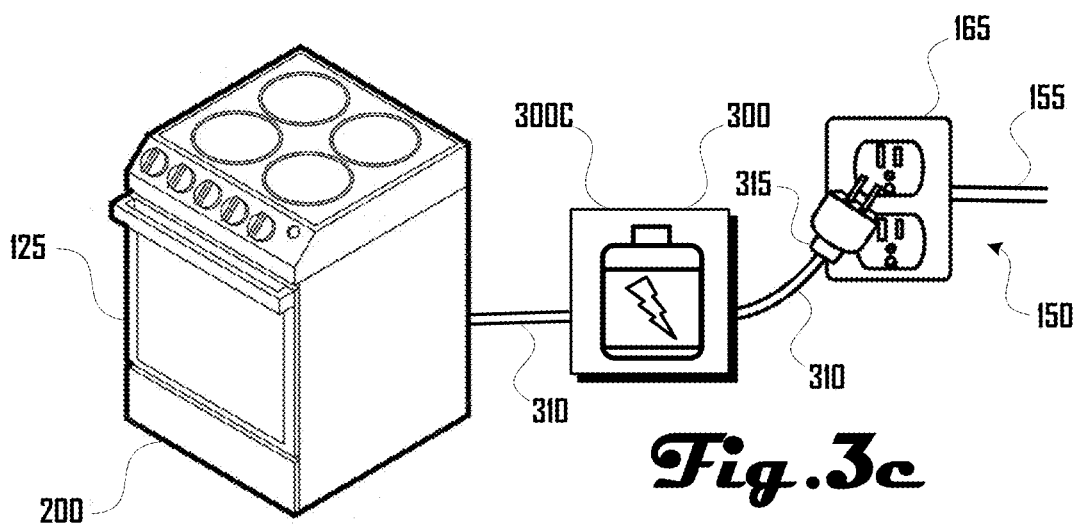
FIG. 3c illustrates another example embodiment of a battery system having a battery and a power cord with a plug, where the battery system can be a unit disposed between the stove load source and a receptacle that is part of a power distribution system.

Turning to FIGS. 3a, 3b and 3c, various example embodiments of battery systems 300 comprising one or more batteries 305 are illustrated. In the example embodiments of FIGS. 3a, 3b and 3c a stove 125 load source is shown being associated with a battery system 300 or having an internal a battery system 300, but it should be clear that various other suitable load sources 200 can be applicable in various embodiments.

FIG. 3a illustrates an example of a stove 125 load source 200 that comprises an embodiment 300A of a battery system 300 having a battery 305. For example, the battery system 300A can be an internal component of the stove 125, an integral component of the stove 125, disposed within a housing of the stove 125, or the like. For example, in some embodiments, a portion of the battery system 300A and/or battery 305 can be an integral part of the stove 125 such that such portions cannot be removed or easily removed from the stove 125, which can include, in some examples, such portions being enclosed within a housing of the stove 125 so that such portions are not accessible externally to users. However, in some examples, the battery 305 can be removable, replaceable, and/or modular as discussed herein.

As shown in FIG. 3a, the stove 125 can comprise a power cord 310 with a plug 315 configured to couple with an electrical power receptacle 165 of a power distribution system 150. For example, the power distribution system 150 can provide power to the receptacle 165 via power lines 155, where the receptacle 165 is disposed on a wall of a building 105 (FIG. 1) with power lines 155 running though the wall, or the like. The stove 125 can plug into the receptacle 165 which can provide electrical power to the stove 125 and the battery 305 of the battery system 300, which can be configured to store electrical power and/or provide electrical power to the stove 125 as discussed herein.

In some embodiments, one or more batteries 305 and/or battery systems 300 can be integrated into a load source 200 (e.g., into an appliance housing) at the factory where the load source is manufactured, or can be integrated into load source aftermarket. For example, load sources 200 (e.g., appliances) can be specifically designed to allow integration of the appropriate quantity of batteries 305 and/or other elements of a battery system 300 within their normal housing. This can allow for such load sources 200 or appliances to be placed within a residence without any change to how they are integrated into standardized fixturing, such as counters. In various embodiments, electrical connections to batteries 305 and/or other elements of a battery system 300 are made in the factory and fully integrated into the appliance circuit. This can allow for load sources 200 such as appliances that utilize DC current (e.g., induction stove) to pull power directly from the one or more batteries 305 without the added cost of a high-power inverter.

In some embodiments, batteries can be designed to be integrated into load sources (e.g., appliances) in an aftermarket factory setting. For example, a company that is not the original equipment manufacturer of an appliance buys new appliances, installs the battery system 300 in their own facility, and re-sells the appliance as new. The retrofitter in some examples installs the one or more batteries 305 and/or elements of the battery system 300 within the housing of the appliance, wiring them directly into the integral electrical system of the appliance. This can be desirable in some embodiments if high-voltage connections are required given the danger of such high-voltage connection if not being handled by a professional. Also, in some embodiments where a load source 200 (e.g., an appliance) has an internal rectification circuit, such as an induction stove or the like, that is converting 60 Hz AC current to DC, it can be desirable in some examples to connect the battery system 300 directly into the internal circuitry of the load source (e.g., to avoid costly addition of high-power inversion).

Figure 16:
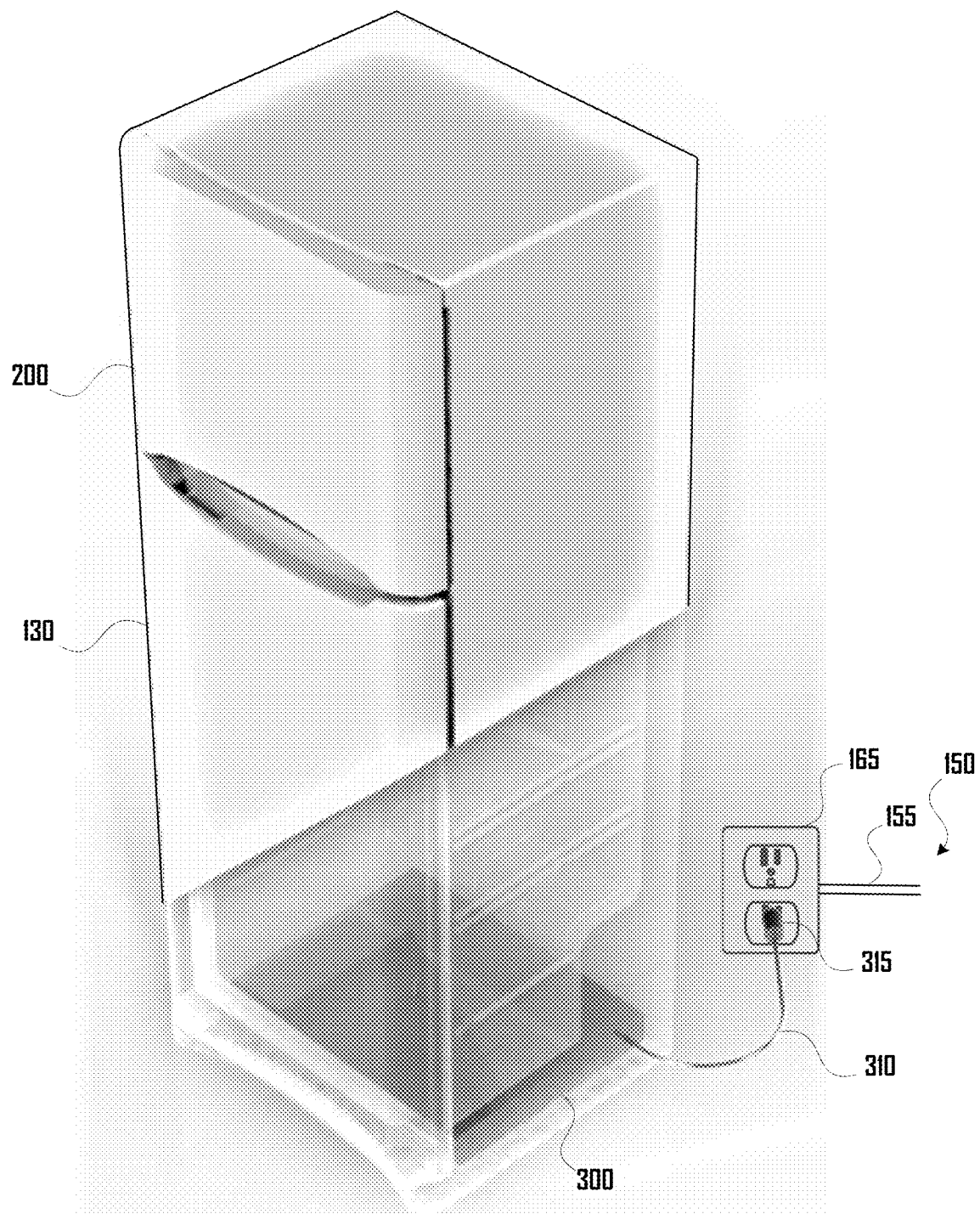
FIG. 16 illustrates an example where the battery system has a relatively thin planar rectangular form factor disposed at the base of the refrigerator with a power cord extending from the refrigerator that can plug into a receptacle of a power distribution system via a power plug.
Figure 17:
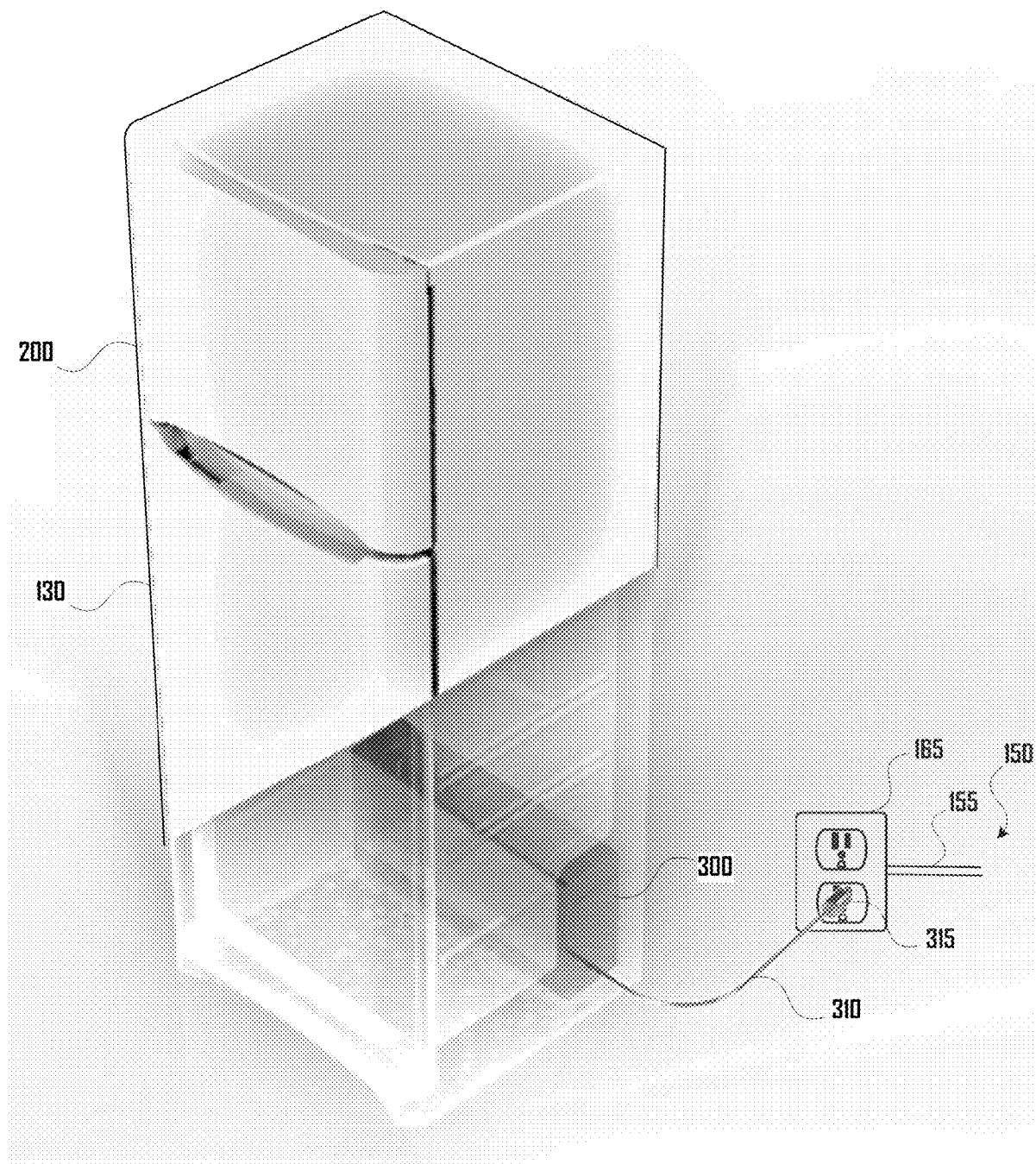
FIG. 17 illustrates an example where the battery system has a rectangular form factor disposed at the base and rear of the refrigerator with a power cord extending from the refrigerator that can plug into a receptacle of a power distribution system via a power plug.
Figure 18:
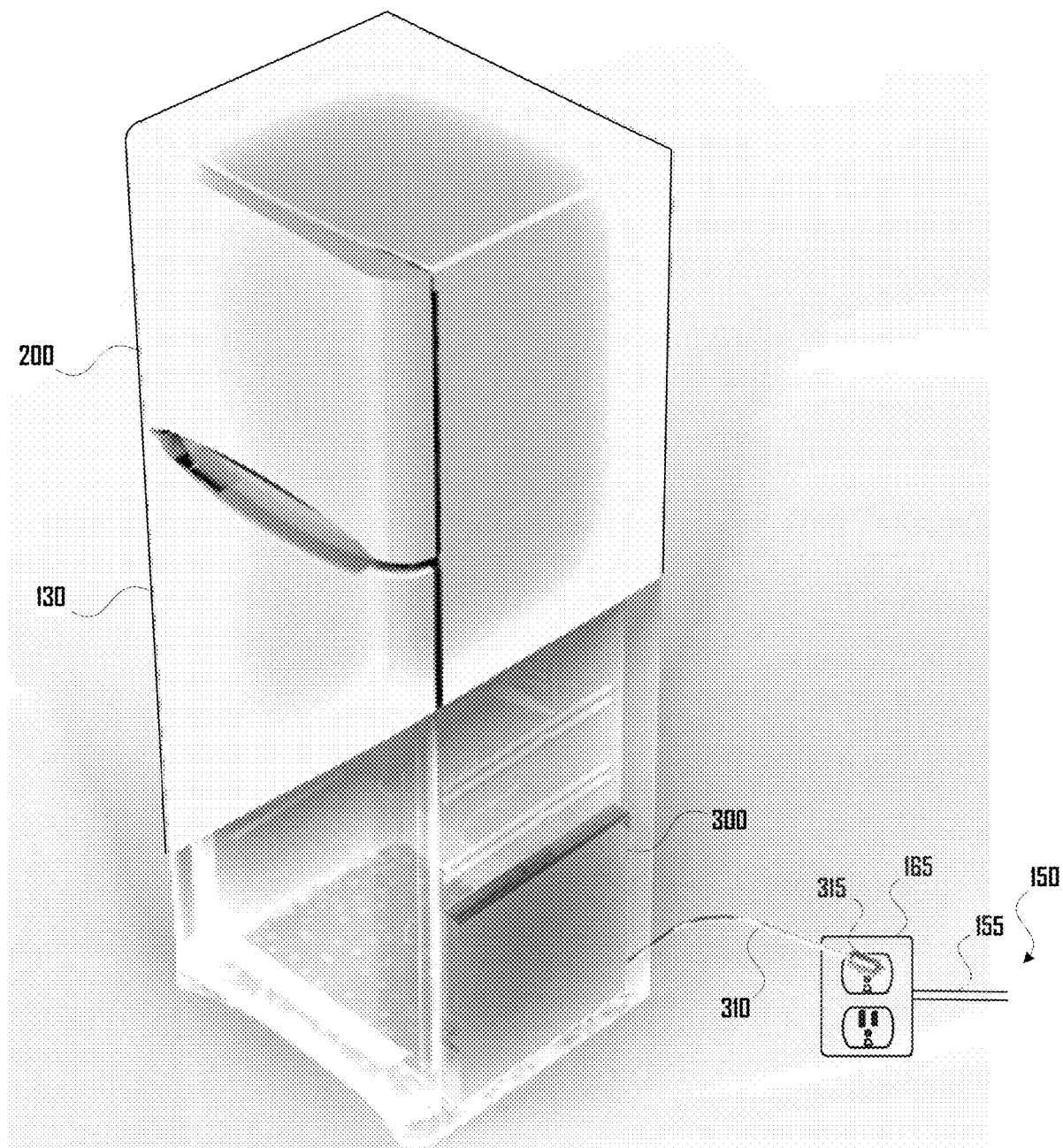
FIG. 18 illustrates an example where the battery system has a relatively thin planar rectangular form factor disposed at a sidewall near the base of the refrigerator with a power cord extending from the refrigerator that can plug into a receptacle of a power distribution system via a power plug.
Figure 20:
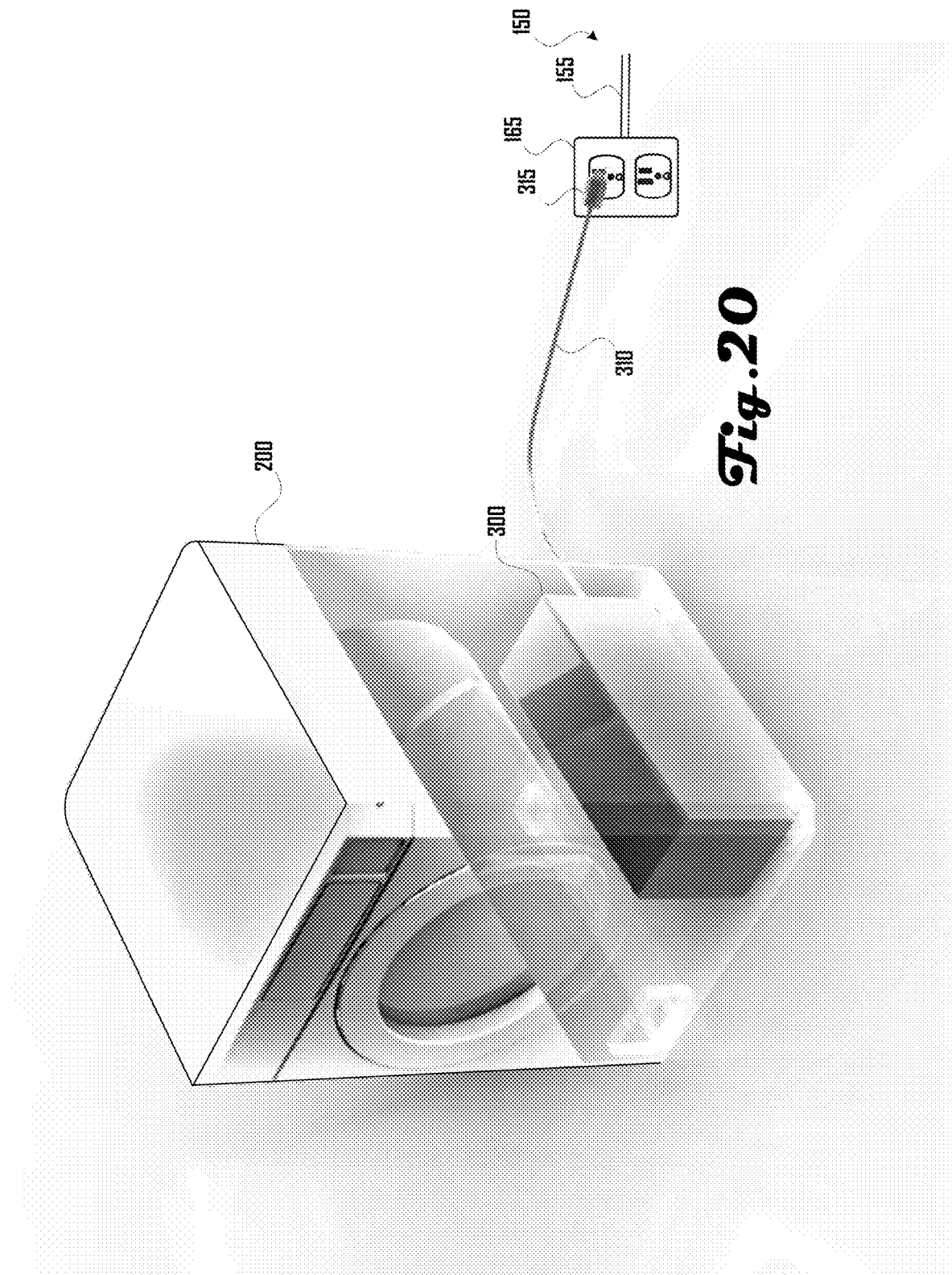
FIG. 20 illustrates an example where the battery system has a rectangular form factor disposed at the base and side of a dryer with a power cord extending from the dryer that can plug into a receptacle of a power distribution system via a power plug.
Figure 21:
FIG. 21 illustrates an example where the battery system has a rectangular form factor that can be disposed in a dryer with a power cord that can plug into a receptacle of a power distribution system via a power plug.
Figure 22:
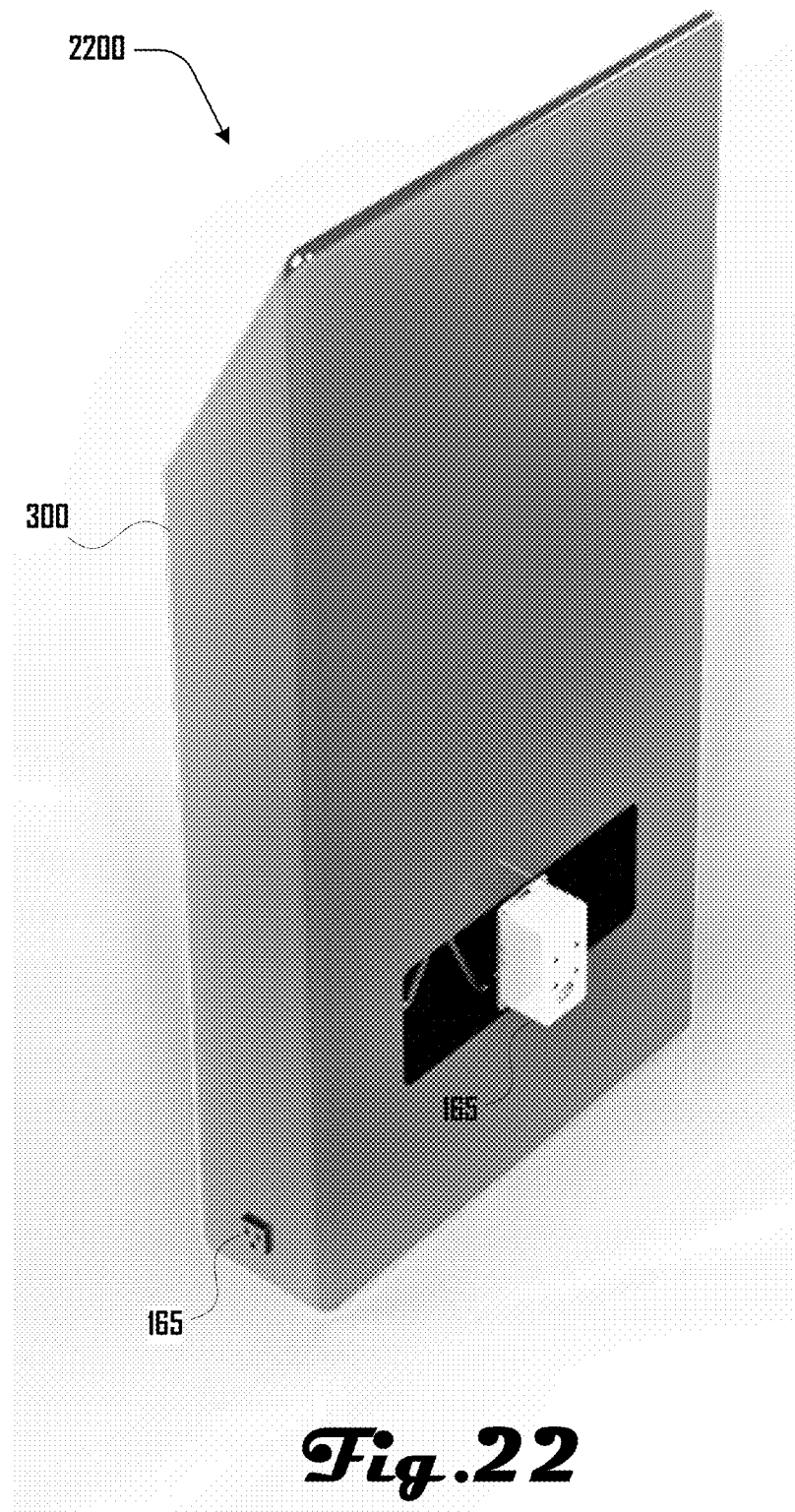
FIG. 22 illustrates a perspective view of a wall-mounted battery system.
Figure 23:
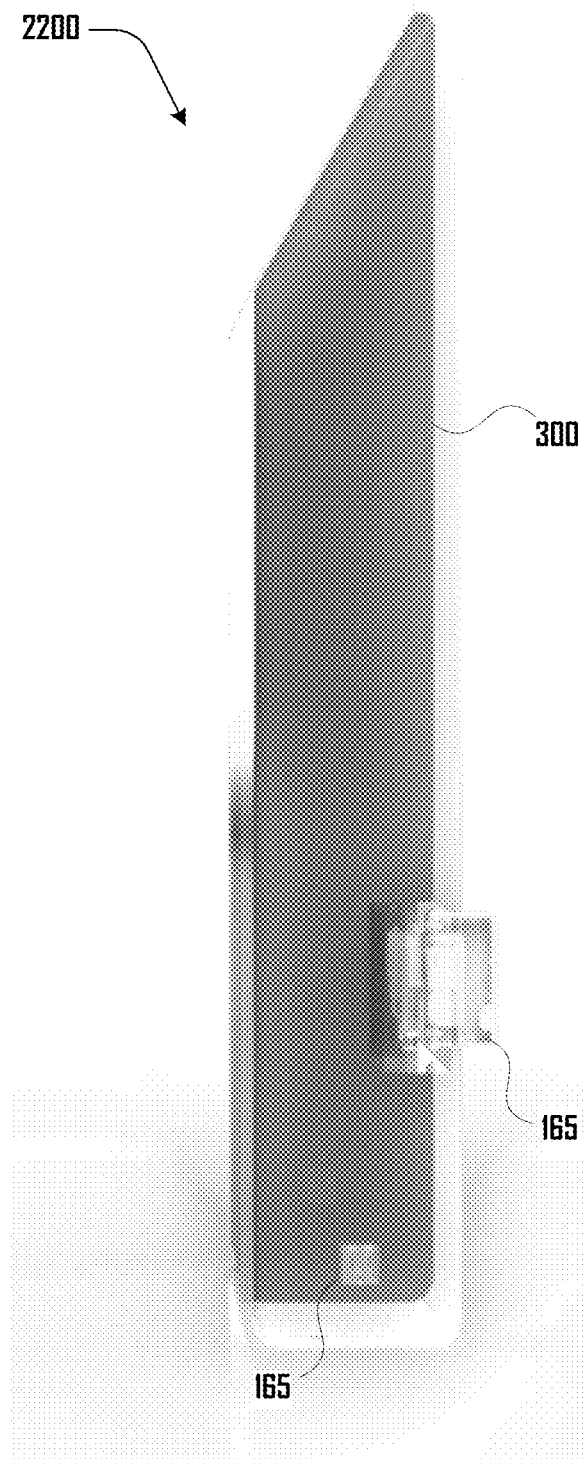
FIG. 23 illustrates a side view of the wall-mounted battery system of FIG. 22.

Battery systems 300 can be disposed within a load source in various suitable ways. For example, FIGS. 16, 17 and 18 illustrate three example embodiments of a battery system 300 disposed within a refrigerator 130 load source 200. FIG. 16 illustrates an example where the battery system 300 has a relatively thin planar rectangular form factor disposed at the base of the refrigerator 130 with a power cord 310 extending from the refrigerator 130 that can plug into a receptacle 165 of a power distribution system 150 via a power plug 315. FIG. 17 illustrates an example where the battery system 300 has a rectangular form factor disposed at the base and rear of the refrigerator 130 with a power cord 310 extending from the refrigerator 130 that can plug into a receptacle 165 of a power distribution system 150 via a power plug 315. FIG. 18 illustrates an example where the battery system 300 has a relatively thin planar rectangular form factor disposed at a sidewall near the base of the refrigerator 130 with a power cord 310 extending from the refrigerator 130 that can plug into a receptacle 165 of a power distribution system 150 via a power plug 315. FIG. 20 illustrates an example where the battery system 300 has a rectangular form factor disposed at the base and side of a dryer with a power cord 310 extending from the dryer that can plug into a receptacle 165 of a power distribution system 150 via a power plug 315. FIG. 21 illustrates an example where the battery system 300 has a rectangular form factor that can be disposed in a dryer with a power cord 310 that can plug into a receptacle 165 of a power distribution system 150 via a power plug 315.

Figure 10:
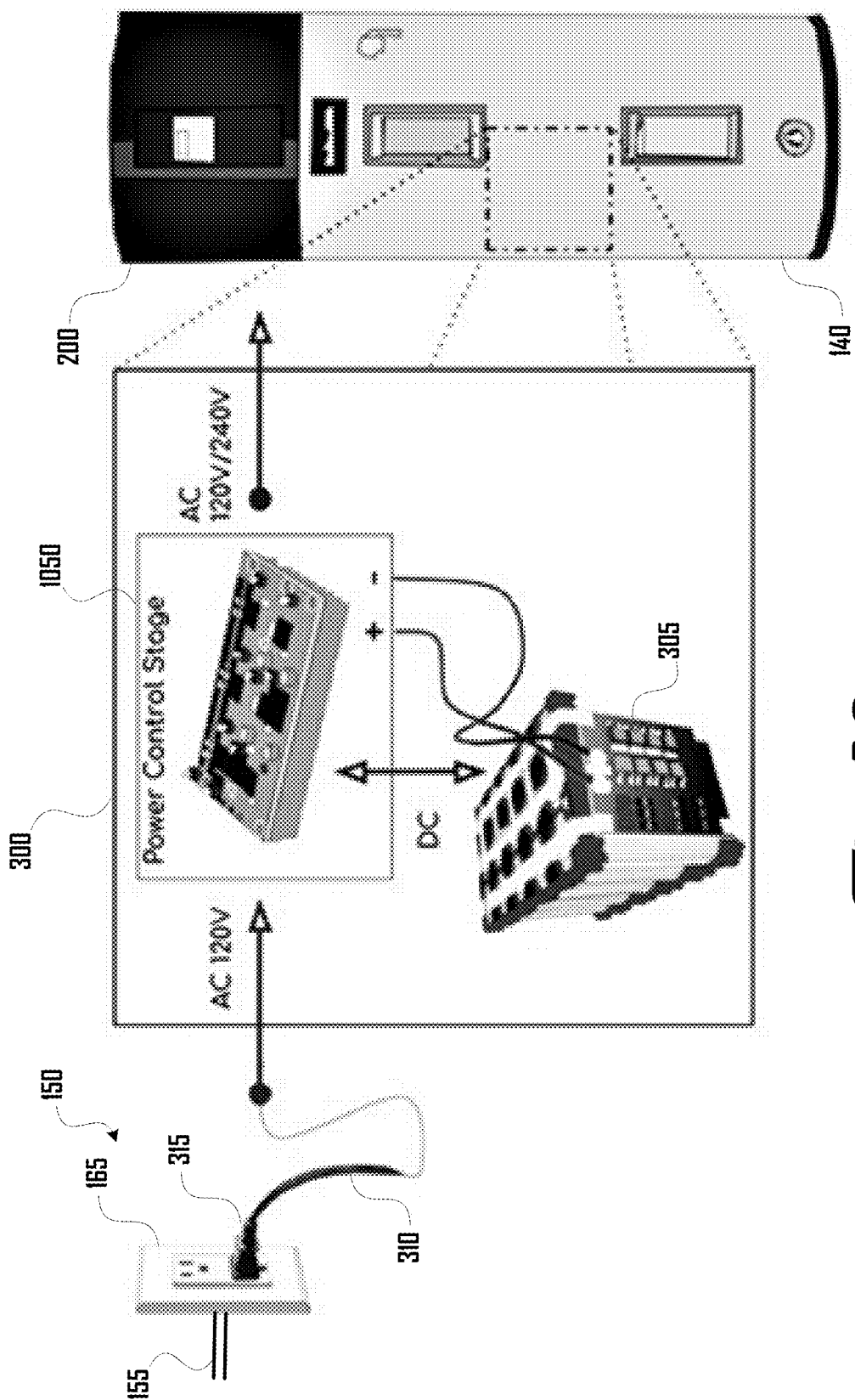
FIG. 10 illustrates an example embodiment of a hot water heater load source having an integrated battery system that comprises a power control stage and a battery.

FIG. 10 illustrates an example embodiment of a hot water heater 140 load source 200 having an integrated battery system 300 that comprises a power control stage 1050 and a battery 305. In this example, the power control stage 1050 obtains AC 120V electrical power by being plugged into a receptacle 165 of a power distribution system 150. The power control stage 1050 can be configured to output AC 120V/240V power to the hot water heater 140 load source 200, which in various examples can be based on electrical power obtained from the battery 305 and/or power distribution system 150. The battery 305 can be operably coupled to the power control stage 1050 and configured to receive and provide electrical power (e.g., direct current (DC)) to the power control stage 1050.

FIG. 3b illustrates another example embodiment 300B of a battery system 300 having a battery 305 and a receptacle 165. For example, the battery system 300B can be part of a power distribution system 150 and can be disposed on and/or in a wall of a building 105 and can comprise the receptacle 165 and the battery 305 that are configured to receive electrical power from a power line 155. In various embodiments, the receptacle 165 and/or battery 305 can be an internal component of the battery system 300B, an integral component of the battery system 300B, disposed within a housing of the battery system 300B, or the like. For example, in some embodiments, a portion of the receptacle 165 and/or battery 305 can be an integral part of the battery system 300B such that such portions cannot be removed or easily removed from battery system 300B, which can include, in some examples, such portions being enclosed within a housing of the battery system 300B so that such portions are not accessible externally to users aside from interface plugs of the receptacle. However, in some examples, the battery 305 can be removable, replaceable, and/or modular as discussed herein.

As shown in FIG. 3b, the stove 125 can comprise a power cord 310 with a plug 315 configured to couple with the electrical power receptacle 165 of the battery system 300B. For example, the battery 305 of battery system 300B and/or the power distribution system 150 (via power lines 155) can provide power to the receptacle 165, where the receptacle 165 is disposed on a wall of a building 105 (FIG. 1) with the power lines 155 running though the wall, between the outlet and the appliance, or the like. The power lines 115 can be configured to provide electrical power to the battery 305, which can be stored by the battery 305 as discussed herein.

In some embodiments, batteries 305 and elements of a battery system 300 are designed to nest with load sources (e.g., appliances), either as a footing, or a backing, etc. Such nesting can be done by the customer in various examples. Batteries 305 and/or elements of a battery system 300 can be designed to nest directly external to the appliance, such as by taking into consideration the shape and intended location of the appliance within a house 105. One or more batteries 305 and elements of a battery system 300 (e.g., power control stage) are packaged in such a way in various examples such that they can be placed directly alongside the appliance. The appliance can be plugged into the battery system 300 and the battery system 300 is then plugged into the wall.

For example, batteries 305 and/or elements of a battery system 300 can be packaged in some embodiments as a flat plate that is sized the same as, similar to, not exceeding, or slightly less than the footprint of a conventional refrigerator, whose widths and depths are often standardized to match counter depths. Such a refrigerator in some examples would be placed on top of the low-profile battery pack, effectively joining the appliance and added storage without any great disturbance to the use, appearance, or placement of the appliance.

Batteries 305 and/or battery systems 300 can be designed to be placed at outlet faceplates in various embodiments. For example, batteries 305 and/or battery systems 300 can be packaged in flat plates that plug directly into standard wall outlets. These plates can be designed to be low profile and can allow an appliance to be pushed up against the wall as it is normally intended to do. The batteries 305 and/or battery systems 300 can be affixed to the wall directly behind an appliance, in some embodiments, such as a dryer, refrigerator or hot water heater, in a way that there is very little change in the placement of the machine.

Figure 11:
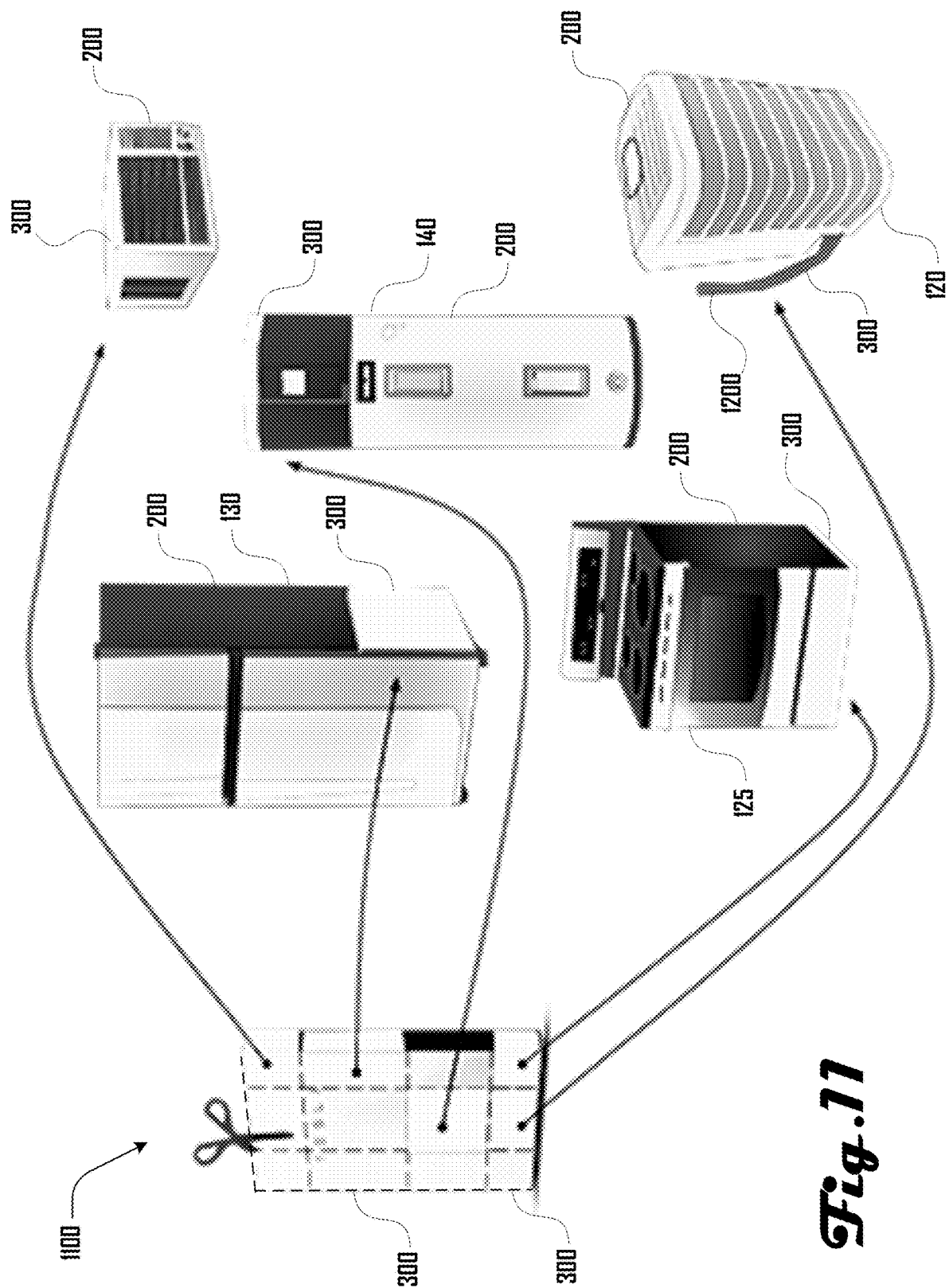
Figure 12:
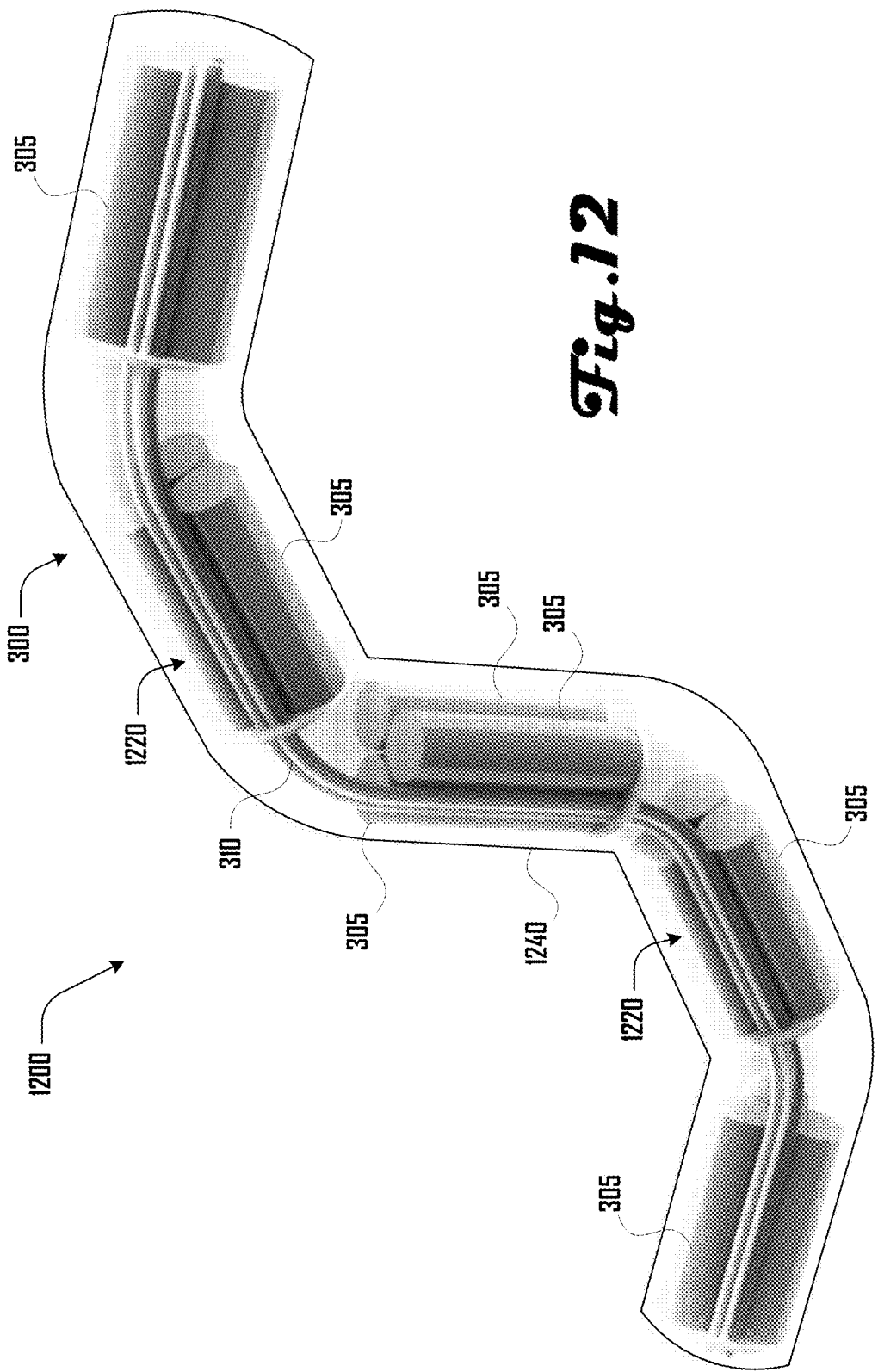
FIG. 12 illustrates an example embodiment of an elongated battery system that comprises a plurality of bundles of batteries disposed along and about a length of power cord and disposed within a sleeve.

For example, FIG. 11 illustrates an example of a battery system block 1100 that comprises a plurality of battery systems 300 that can be coupled with a plurality of load sources 200, with the battery systems 300 having various suitable form factors that allow the battery systems 300 to couple with load sources 200 having different shapes, sizes and forms such as a heat pump 120, electric stove 125, refrigerator 130, water heater 140, and the like. For example, as shown in the example of FIG. 11, the battery system block 1100 can comprise one or more thin planar rectangular battery systems 300 that can couple to, the bottom of a stove 125, a side of a refrigerator 130. The battery system block 1100 can further comprise a round planar battery system 300 that can couple to the top of a water heater 140. The battery system block 1100 can further comprise an elongated embodiment 1200 of a battery system 300 that can act similarly to or in addition to a power cord, which can couple to various load sources 200 such as a heat pump 120 as shown in the example of FIG. 11. FIG. 12 illustrates an example embodiment of an elongated battery system 1200 that comprises a plurality of bundles 1220 of batteries 305 disposed along and about a length of power cord 310 and disposed within a sleeve 1240.

FIG. 3c illustrates another example embodiment 300C of a battery system 300 having a battery 305 and a power cord 310 with a plug 315. For example, the battery system 300C can be a unit disposed between the stove 125 load source 200 and a receptacle 165 that is part of a power distribution system 150. The receptacle 165 can be disposed on and/or in a wall of a building 105 and can be configured to receive electrical power from a power line 155.

In various embodiments, the battery 305 can be an internal component of the battery system 300C, an integral component of the battery system 300C, disposed within a housing of the battery system 300C, or the like. For example, in some embodiments, the battery 305 can be an integral part of the battery system 300C such that such portions cannot be removed or easily removed from battery system 300C, which can include, in some examples, such portions being enclosed within a housing of the battery system 300C. However, in some examples, the battery 305 can be removable, replaceable, and/or modular as discussed herein.

As shown in FIG. 3c, the battery system 300C can comprise a power cord 310 with a plug 315 configured to couple with the electrical power receptacle 165 of the power distribution system 150. For example, the power distribution system 150 (via power lines 155) can provide power to the receptacle 165, where the receptacle 165 is disposed on a wall of a building 105 (FIG. 1) with the power lines 155 running though the wall, or the like. The receptacle 165 can be configured to provide electrical power to the battery 305, which can be stored by the battery 305 as discussed herein and can power the stove 125 load source 200. Additionally, in various embodiments, the receptacle 165 can be configured to provide electrical power to the stove 125 load source 200 via the battery system 300C. The stove 125 can be electrically coupled to the battery system 300C in various suitable ways, including directly via a power cord 310 or via a power cord 310 that removably plugs into the battery system 300C via a plug 315 or other suitable elements.

Figure 15:
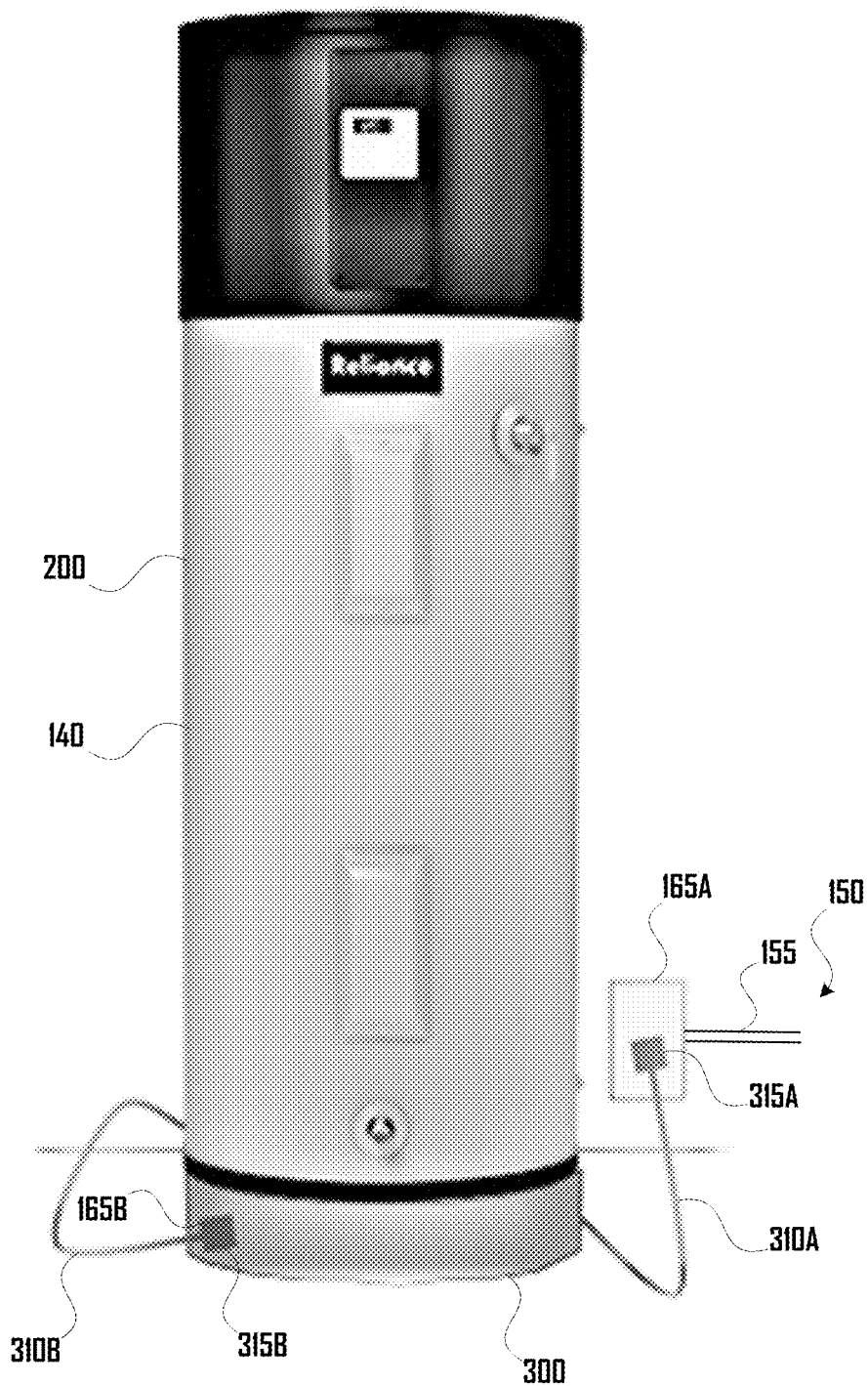
FIG. 15 illustrates an example of a water heater load source with a round battery system disposed at the base of the water heater that matches the shape of the water heater.
Figure 19:
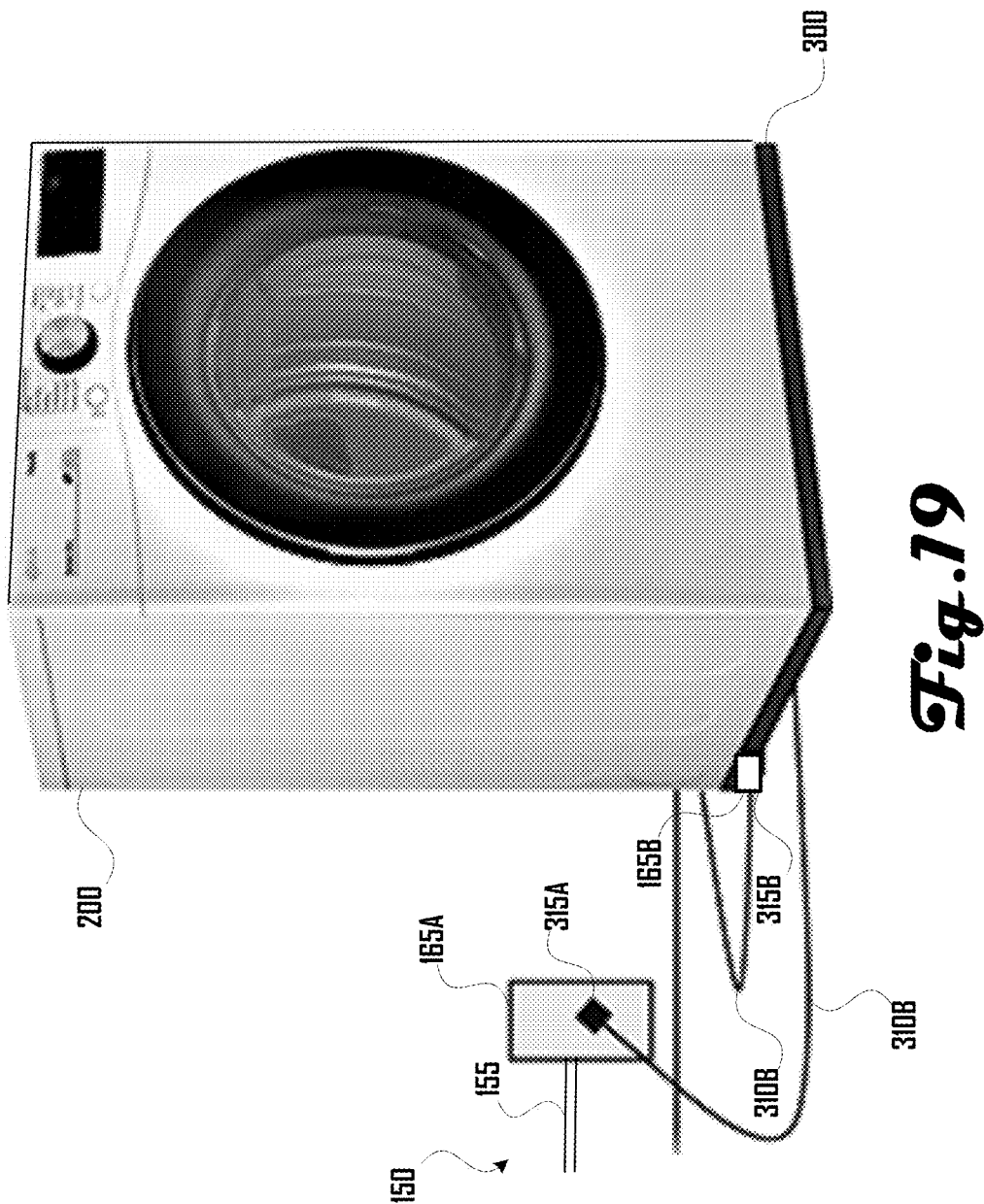
FIG. 19 illustrates an example of a dryer load source with a rectangular battery system disposed at the base of the dryer that matches the shape of the dryer.

For example, FIG. 15 illustrates an example of a water heater 140 load source 200 with a round battery system 300 disposed at the base of the water heater 140 that matches the shape of the water heater 140. The battery system 300 is plugged into a wall receptacle 165A of a power distribution system 150 via a first plug 315A and first power cord 310A. The water heater 140 load source 200 is plugged into the battery system receptacle 165B of the battery system 300 via a second power cord 310B and plug 315B of the water heater 140 load source 200. In another example, FIG. 19 illustrates an example of a dryer load source 200 with a rectangular battery system 300 disposed at the base of the dryer that matches the shape of the dryer. The battery system 300 is plugged into a wall receptacle 165A of a power distribution system 150 via a first plug 315A and first power cord 310A. The dryer load source 200 is plugged into the battery system receptacle 165B of the battery system 300 via a second power cord 310B and plug 315B of the dryer 140 load source 200.

Additionally, it should be clear that a powered building system 100 can include any suitable number and type of battery systems 300 including one or more of the battery systems 300 shown in in FIGS. 3a, 3b, 3c. However, in some examples one or more of the one or more of the battery systems 300 shown in in FIGS. 3a, 3b, 3c can be specifically absent.

One example embodiment includes a first battery system that is an integral component of and disposed within a housing of a first load source of the plurality of load sources, the first load source comprising a first power cord plugged into a first receptacle of the plurality of receptacles, the first battery system comprising a first battery configured to obtain and store power from the first receptacle, the first load source being configured to be fully powered by power stored by the first battery and configured to be fully powered by power obtained from the first receptacle and configured to be partially powered by both the first battery and power obtained from the first receptacle; a second battery system that includes a second battery and a second receptacle of the plurality of receptacles, the second battery system disposed within a wall of the building, with a second load source comprising a second power cord plugged into the second receptacle of the plurality of receptacles, with the second battery configured to obtain and store power from the electrical power distribution system, the second load source being configured to be fully powered by power stored by the second battery and configured to be fully powered by power obtained from the electrical power distribution system and configured to be partially powered by both the second battery and power obtained from the electrical power distribution system; and a third battery system electrically disposed between a third load source and a third receptacle of the plurality of receptacles, the third battery system comprising a third electrical power cord plugged into the third receptacle, with the third load source comprising a fourth power cord plugged into a fourth receptacle of the third load source, the third battery system comprising a third battery configured to obtain and store power from the third receptacle, the third load source being configured to be fully powered by power stored by the third battery and configured to be fully powered by power obtained from the third receptacle via the third battery system and configured to be partially powered by both the third battery and power obtained from the third receptacle via the third battery system.

Figure 4:
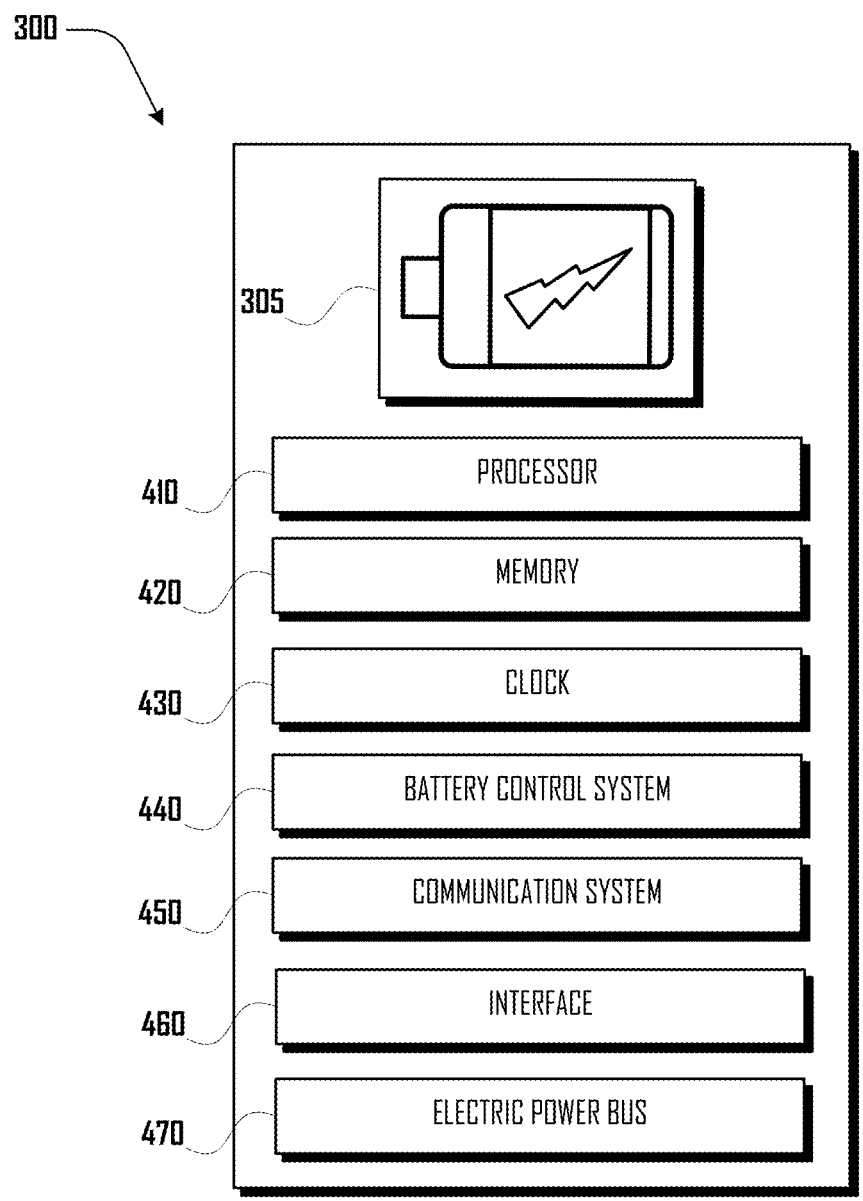
FIG. 4 illustrates one example embodiment of a battery system that can comprise one or more batteries, a processor, a memory, a clock, a battery control system, a communication system, an interface and an electrical power bus.

A battery system 300 can comprise various suitable elements. For example, FIG. 4 illustrates one example embodiment of a battery system 300, which can comprise one or more batteries 305, a processor 410, a memory 420, a clock 430, a battery control system 440, a communication system 450, an interface 460 and an electrical power bus 470.

For example, in some embodiments, a battery system 300 can comprise a computing device which can be configured to perform methods or portions thereof discussed herein. The memory 420 can comprise a computer-readable medium that stores instructions, that when executed by the processor 410, causes the battery system 300 to perform methods or portions thereof discussed herein, or other suitable functions. The clock 430 can be configured to determine date and/or time (e.g., year, month, day of the week, day of the year, time, and the like) which as discussed in more detail herein, can in some examples be used to configure the power storage and/or power discharge of the battery 305 based on time.

The battery control system 440 in various embodiments can be configured to control power storage and/or power discharge of the battery 305 based on instructions from the processor, or the like. Additionally, in some embodiments, the battery control system 440 can determine various aspects, characteristics or states of the battery 305 such as a charge state (e.g., percent charged or discharged), battery charge capacity, battery health, battery temperature, or the like. For example, in various embodiments, a battery system 300 can comprise various suitable sensors to determine such aspects, characteristics or states of the battery 305 or aspects, characteristics or states of other elements of a building system 100 which can include environmental conditions such as temperature, humidity, or the like internal to or external to a building 105.

In various embodiments, the communication system 450 can be configured to allow the battery system 300 to communicate via one or more communication network as discussed in more detail herein, which in some embodiments can include wireless and/or wired networks and can include communication with devices such as one or more other battery systems 300, user device, server, or the like.

The interface 460 can include various elements configured to receive input and/or present information (e.g., to a user). For example, in some embodiments, the interface can comprise a touch screen, a keyboard, one or more button, one or more light, a speaker, a microphone, a haptic interface, and the like. In various embodiments, the interface 460 can be used by a user for various suitable purposes, such as to configure the battery system 300, view an aspect, characteristic or state of the battery system 300, configure network connections of the battery system 300, or the like.

The electrical power bus 470 can be configured to obtain electrical power from one or more sources and/or provide electrical power to one or more load sources 200. For example, in various embodiments, the electrical power bus 470 can obtain power from one or more power receptacles 165 (see e.g., FIGS. 3a and 3c) or other suitable interface with a power distribution system 150, or directly from a power source such as an electrical power grid 110, solar panel 115, or the like. Such obtained electrical power can be stored via one or more batteries 305 or can be directed to one or more load sources 200 connected to the battery system 300. Such obtained electrical power can be directed to such one or more load sources 200 via the one or more batteries 305 or bypassing the one or more batteries 305.

The one or more batteries 305 can be any suitable system configured to store and discharge energy. For example, in some embodiments, the one or more batteries 305 can comprise rechargeable lead-acid, nickel-cadmium (NiCd), nickel-metal hydride (NiMH), lithium-ion (Li-ion), lithium-ion polymer (LiPo), rechargeable alkaline batteries, or the like. As discussed herein, rechargeable in various embodiments can be defined as having the ability to store and discharge energy multiple times without substantial degradation of the ability store and discharge energy for at least a plurality of cycles (e.g., 5, 10, 50, 100, 500, 1000, 10k, 100k, 1 M, 10 M, 100 M, or the like). While various preferred embodiments can include chemical storage of electrical energy, in further embodiments one or more batteries 305 can be configured to store energy in various suitable ways, such as mechanical energy, compressed fluid, thermal energy, and the like.

In some embodiments, the one or more batteries 305 can contain or be defined by removable cartridges that allow the one or more batteries 305 to scale or be replaced. Battery packs in some examples can be composed of small sub-packs that can be easily removed. This can allow for old or faulty cells to be replaced in some examples. Additionally, in some examples such a configuration allows for the fine tuning of pack size within a network of battery systems 300 as discussed herein. For example, one or more batteries 305 can be initially sized and colocated with an expected load source 200.

As the battery system 300 (or a powered building system 100 or battery network 500) monitors and learns the particular behavior of the load source 200, user behavior related to the load source 200, and the like, a determination may be made that that the size of one or more batteries 305 of the battery system 300 is too large or too small. Likewise, a different battery system 300 on the network of battery systems 300 may determine that its pack is too large or too small or another device may make such a determination as discussed herein. In some embodiments, a battery system 300 can indicate via an interface 460 that the battery system 300 would be better utilized if a sub-pack (e.g., one or more batteries 305 of a plurality of batteries) were moved from one load source 200 to the other (e.g., by moving one or more batteries 305 from a first battery system 300 to a second battery system 300 within a powered building system 100). Methods of determining a configuration of one or more batteries 305 of a powered building system 100 or battery network 500 (see FIG. 5) are discussed in more detail herein.

It should be clear that the example of FIG. 4 is only one example embodiment of a battery system 300 and that battery systems 300 having fewer or more elements or having more or less complexity are within the scope and spirit of the present disclosure. For example, one or more of the elements of FIG. 4 can be specifically absent in some embodiments, can be present in any suitable plurality, or the like. In some embodiments, a communication system 450 can be absent and the battery system 300 can be inoperable for wired and/or wireless communication with other devices. In some embodiments, elements such as processor 410 and clock 430 can be absent. The interface 460 can comprise a plurality of interface elements or a complex interface in some examples, or can be a simple interface 460 in some embodiments, or can be absent. In some embodiments, an interface for the battery system 300 can be embodied on a separate device such as a user device (e.g., a smart phone, laptop, home automation system, or other suitable device). Additionally, battery systems 300 can be various suitable sizes, including systems that weigh 1-5 pounds, 10-30 pounds, 50-100 pounds, 150-500 pounds, 500-1,500 pounds, or the like.

In targeting which loads are best addressed in some embodiments, we can look at data from the EIA's Residential Energy Consumption Survey. Assuming the electrification of residential energy use, we can combine current electrical use with natural gas and propane (assuming commonly obtained coefficients of performance, where applicable) used in the home to calculate total energy. We see that, of the residential uses, the largest users (HVAC) require professional installation anyway, and are better candidates for thermal storage. Other users (e.g., lighting) are widely distributed in many devices throughout the home, and may not be good first targets for battery integration in some embodiments. The remaining uses are large enough to be significant in the picture of residential energy use (>100 kWh per year per household) and are packaged as single commodity appliances. These include refrigerators, TVs, clothes dryers, ranges, freezers, dehumidifiers, microwaves, and the like. Of these, clothes dryers and induction ranges can be of particular interest in some embodiments, as they typically require a dedicated, high-capacity 240V circuit, which can be avoided in various embodiments through battery integration (e.g., a battery system 300 as discussed herein). Some embodiments can include a (e.g., small) battery integrated directly into a light bulb that automatically switches on when the power goes off or grid demand is at a max or time-of-use (TOU) rates are high.

| End use | Household kWh/year | Share | Amenable to battery integrated appliance of one specific example embodiment | Req. 240 V? | Peak hourly to Average* |
|---|---|---|---|---|---|
| Space heat | 3985 | 31% | NO, requires prof. install, Thermal storage | Yes | 7.6 |
| Water heat | 2368 | 19% | NO, requires prof. install, Thermal storage | Yes | 4.2 |
| AC | 1812 | 14% | NO, requires prof. install, Thermal storage | Yes | 8.0 |
| Lighting | 1104 | 8% | NO, not centralized | No | 2.6 |
| Refrigeration | 750 | 6% | YES, commodity appliance, homeowner install | No | 1.3 |
| TV + Periph. | 738 | 6% | YES, commodity appliance, homeowner install | No | 2.2 |
| Clothes Dryer | 583 | 5% | YES, commodity appliance, homeowner install | Yes | 39 |
| Range | 481 | 4% | YES, commodity appliance, homeowner install | Yes | 3.9 |
| Ceiling fan | 194 | 2% | YES, commodity appliance, homeowner install | No | 2.1 |
| Freezer | 173 | 1% | YES, commodity appliance, homeowner install | No | 1.3 |
| Dehumidifiers | 130 | 1% | YES, commodity appliance, homeowner install | No | 2.1 |
| Microwave | 116 | 1% | YES, commodity appliance, homeowner install | No | 2.1 |
| Hot tub | 70 | <1% | NO, <100 kWh/year | Yes | 3.5 |
| Clothes wash | 64 | <1% | NO, <100 kWh/year | No | 39 |
| Pool heat | 28 | <1% | NO, <100 kWh/year | Yes | 3.6 |

Table 1: Comparing total electrified residential energy by end use. Some larger users (HVAC) require professional installation, and may not be good candidates for appliance integration in some embodiments. Some users may be too small to warrant battery integration in some embodiments. A non-limiting list of candidates in the example embodiment illustrated in Table 1 includes refrigerators, TVs, clothes dryers, ranges, freezers, dehumidifiers, and microwaves. Data from RECS. *Estimates for the ratio of peak hourly load to the average hourly load, derived from ResStock models. This example embodiment should not be construed to be limiting or an indication that the named example appliances are or are not part of various embodiments. Indeed, in further embodiments, any of the appliances discussed above, herein or otherwise may or may not be part of some embodiments, and inclusion or exclusion of a given system or appliance in a given embodiment can be for various suitable reasons or rationales.

Taking as a case study the electrification of home cooking appliances, data shows the majority of residential cooking loads can be during the evening hours, which can be far off the times of peak solar generation. 112 billion cubic feet of natural gas and 211 million gallons of propane are used for cooking each year, representing emissions of 6 and 1.2 MT CO2e, respectively. Further, as gas cooking is still seen as "high-end" compared to the electric resistance stoves dominating the existing appliance stock, the saturation of gas ranges is increasing, rather than decreasing. Comparing the 2009 and 2015 Residential Energy Consumption Surveys, the portion of households using natural gas or propane as their main cooking fuel increased by 5%. To effectively decarbonize the residential sector, this trend must be reversed. In addition to the carbon emissions impact of this trend, there is a growing body of scientific literature demonstrating the negative health effects of indoor air pollution from fossil fuel cooking, including inflaming respiratory conditions like asthma.

Turning to FIG. 5, an example embodiment of a battery network 500 is illustrated that comprises three battery systems 300A, 300B, 300C, a battery server 510 and a user device 520, which are operably connected via a network 530. In various embodiments, the network can comprise various suitable wired and/or wireless networks, including Wi-Fi, Bluetooth, a wired connection, a cellular network, the Internet, a local area network (LAN), wide area network (WAN), a wired connection, or the like. In various embodiments, the battery systems 300A, 300B, 300C can communicate with each other and/or the battery server 510 and user device 520 via a communication system 450 (see FIG. 4).

In some embodiments, the battery systems 300 can obtain data from, send data to, or be controlled by one or both of the battery server 510 and user device 520 as discussed in more detail herein. In some embodiments, the battery server 510 and/or user device 520 can be remote from are proximate to the battery systems 300 of the battery network 500. For example, in some embodiments, the battery systems 300 can be disposed within or associated with load sources 200 of a house and the user device 520 can be used to configure the battery systems 300 individually or collectively. The user device 520 can be a smart phone in some examples, and may be used by a user while in or around the house or used while the user is remote from the house. In some examples, the battery server 510 can be a remote physical or cloud-based server or server system that can be configured to store data related to the battery systems 300, store data provided by the battery systems 300 and/or user device 520, or configure the battery systems 300 and/or user device 520 as discussed in more detail herein.

While the embodiment of a battery network 500 of FIG. 5 shows one example, it should be clear that numerous suitable additional configurations of a battery network 500 are within the scope and spirit of the present disclosure. For example, in further embodiments, any suitable plurality of battery systems 300 can be part of a battery network 500 including 1, 2, 3, 4, 5, 6, 7, 8, 9, 10, 20, 50, 100, 1k, 10k, 100k, 1 M, 5 M, 10 M, 50 M, or the like. Similarly, there can be any suitable number of battery servers 510 and user devices 520 or one or both of a battery server 510 and user device 520 can be absent. Additionally, in some examples, a battery server 510 and/or user device can be part of one or more battery systems 300 and need not be a separate element as shown in the example of FIG. 5. For example, in some embodiments, there can be a network of a plurality of battery systems 300 with one or more of such battery systems having the capabilities, functionalities, elements or the like of one or both of a battery server 510 and user device 520. For example, a mesh network of a plurality of battery systems 300 can have a central hub battery system 300 that controls, stores data for, or provides data to the entire network.

In various embodiments, there may be different sets of batteries that are associated with a given user or administrator in a battery network 500. For example, in some embodiments there can be a plurality of separate powered building systems 100 (see e.g., FIG. 1) that each comprise a plurality of battery systems 300 and each of these separate powered building systems 100 can be associated with a different user or administrator and respectively controlled by a different user device 520 associated with the different user or administrator. However, in some embodiments, all of such separate powered building systems 100 can communicate with the same battery server 510, which can be configured to store data associated with different user or administrator accounts associated with the different powered building systems 100. Such pooled data can be used to configure, or provide information to the plurality of different powered building systems 100 as discussed in more detail herein, including network-wide, worldwide, country-wide, statewide, county-wide, town-wide, block-wide, or the like.

Despite the listed advantages of appliance-integrated batteries and batteries associated with appliances discussed herein (e.g., battery systems 300), the described approach of various embodiments can be a significant perturbation to the status quo in some examples and can come with a number of risks. For example, a naive implementation of point-of-use batteries may result in an increase in the total capacity of storage required for a home. If the size of an appliance battery 305 or appliance-associated battery 305 is poorly matched to the patterns of energy demand, some of the capacity may remain unused, resulting in wasted reserves. The mitigation strategies for this risk can include one or more of the following.

For example, the sizing of batteries 305 in some embodiments can be based on data analytics and predictive models of use, to enable the best correlation between estimates of load shift and performance in the field. In some examples, such sizing can include determining a size of one or more batteries 305 that is to be installed integrally within a given load source 200 based on anticipated use within a given powered building system 100, location within a powered building system, regional location, or the like. Similarly, in some embodiments, a user can be provided with a suggestion for a size of battery 305 to associate with a given load source 200, which may include suggestions on a size of a modular battery 305 to associate with a load source 200 (e.g., internally, externally, within a wall receptacle, or the like).

Additionally, as discussed herein, a powered building system 100 or battery network 500 can comprise a plurality of battery systems 300 associated with respective load sources 200 with each of the battery systems 300 comprising one or more modular batteries 305. In various embodiments, the powered building system 100 or battery network 500 can monitor the plurality of battery systems 300 and determine whether modular batteries 305 should be removed from the battery systems 300; should be added to the battery systems 300; should be moved from one battery system 300 to another battery system 300; should be removed and replaced with a larger or smaller modular battery 305; should be removed and replaced with a healthier battery 305; or the like. In some embodiments, such monitoring can be done by one battery system 300 of a plurality of battery systems 300, by a battery server 510, by a user device 520, or the like.

For example, a method of determining a configuration of a plurality of batteries 305 of a plurality of battery systems 300 within a powered building system 100 or battery network 500 can comprise obtaining data regarding a current configuration of the plurality of batteries 305. For example, in some embodiments, batteries 305 plugged into battery systems 300 can have an identifier that indicates characteristics of the battery 305 (e.g., a unique battery identifier, a battery model identifier, or the like) or information regarding battery configuration can be input by a user. In some embodiments, such battery configuration data can be obtained directly from interrogation of the plurality of battery systems 300, can be stored in a user power profile, indicated by a user, or the like.

The method can further include monitoring use and/or performance of the plurality of batteries 305 and/or battery systems 300. For example, such use and/or performance data can be stored in a user power profile. A determination can be made whether a change should be made to the current battery configuration based on the use and/or performance data, the current battery configuration, characteristic of desirable and/or undesirable performance of the batteries 305, battery systems 300, powered building system 100, battery network 500, or the like. If a determination is made that a change to the current battery configuration should be made (e.g., it would be desirable to make a change), then one or more suggested changes can be indicated to a user (e.g., via an interface 460, user device 520, or the like). Such a determination can be made based on available additional capacity (e.g., open battery slots where additional batteries can be coupled to one or more battery systems 300), ability to swap different sizes of batteries (e.g., battery slots that allow for larger and/or smaller batteries being swapped), or the like.

For example, a determination can be made that a powered building system 100 or battery network 500 would be able to store and/or use more renewable energy (e.g., from solar panels 115), instead of using power from the grid 110 by increasing the size of one or more batteries 305. In some examples, increasing total battery storage capacity of the powered building system 100 or battery network 500 regardless of location of battery systems 300 (e.g., regardless of load source 200 associated with the battery system) may be suitable.

However, in some examples, increasing the capacity of a battery system 300 associated with a specific load source 200 that frequently consumes an amount of energy that is more than the capacity of the one or more batteries 305 of the battery system 300 can be desirable. In other words, it can be determined that increasing the storage capacity at given battery system 300 can allow sufficient renewable power to be stored such that typical use of a load source 200 associated with that given battery system 300, when renewable power is not directly available, does not require (or requires less) grid power to be used to power that load source 200, which can be desirable from a cost and/or environmental perspective.

In some examples, a determination can be made to decrease the capacity of a battery system 300 associated with a specific load source 200, such as when energy storage capacity of one or more batteries 305 of the battery system 300 is only minimally or rarely used (e.g., a maximum of 5%-10% of the battery storage capacity is ever used). In such an example, it may be desirable to re-deploy one or more batteries 305 to another battery system 300 where storage capacity can be better utilized or to decrease the physical size of the battery system 300, which may be desirable to reduce visibility of the battery system 300 or to allow for more desirable placement of a load source 200 (e.g., appliance) about the battery system 300.

In another example, a determination can be made that one or more batteries 305 of a battery system has decreasing performance over time, which may be indicative of the one or more batteries failing and may make it desirable for such one or more batteries 305 to be indicated for replacement or removal (e.g., due to poor performance, fire danger, or the like).

In a further example, a determination can be made that a different type of battery 305 may be desirable for coupling with a battery system 300 associated with a given load source 200 given how such a load source 200 is used or operates. For example, where a given load source 200 is typically used for a short period of time at high power, then a determination can be made to replace a first battery 305 with a second battery that has better performance for such power use. Similarly, where a load source 200 is constantly on at low power, a determination can be made to replace a first battery 305 with a second battery that has better performance for such power use.

While some examples of determining battery configuration can relate to a powered building system 100 or battery network 500 having a plurality of battery systems 300, in some embodiments such battery configuration determination can relate to a powered building system 100 or battery network 500 having only a single battery system 300 or can be applied at the level of a single battery system 300 (e.g., regardless of and unaware of whether there are other battery systems 300 present in the powered building system 100 or battery network 500).

Also, while various embodiments relate to determining battery configurations for long-term use to support typical use of load sources 200, in some embodiments atypical or acute power needs can be identified and a temporary battery configuration can be suggested. For example, in exceptional circumstances, when usage patterns deviate from the norm, one or more batteries 305 can be moved between end uses (e.g., between different battery systems 300). In some examples, sub-packs can be brought from one load source 200 to the other to facilitate this need. In another example, a suggestion can be made to add a battery 305 to a battery system 300 or to swap-in a changed battery 305 to accommodate a temporary or atypical power need (e.g., during a power grid outage, during holidays when more cooking may be done, during a heat wave, or the like).

In various embodiments, removal, insertion or swapping of batteries 305 can be performed manually by a user. However, some embodiments can comprise a mobile autonomous device that carries power between appliances via portable battery or battery swapping.

Figure 6A:
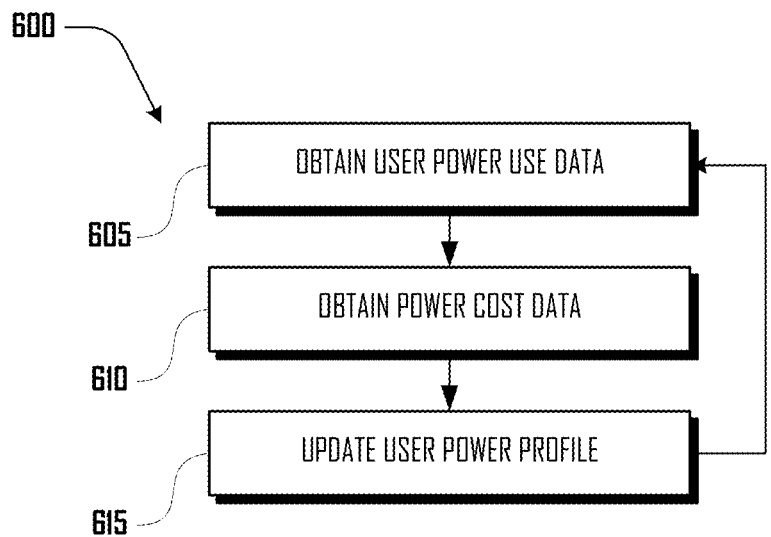
FIG. 6a illustrates an example method of updating a user power profile.

Additionally, in some embodiments, on-board or network control laws can be adaptive to patterns of use, which can allow a given battery capacity to adapt to expected demands. Further, these laws in various embodiments can be configured to adapt to local time-of-use rates, allowing behind-the-scenes energy arbitrage. Implementation of these control laws can be based on reinforcement learning and controls techniques, accompanied by best practice user interfaces allowing homeowner monitoring and tuning. For example, FIG. 6a illustrates an example method 600 of updating a user power profile, which begins in block 605, where user power data is obtained. In block 610, power cost data is obtained, and in block 615, a user power profile is updated.

The method 601 cycles back to block 605, such that the user power profile can continue to be updated, which can include updates in real-time or periodic updates at various suitable intervals (e.g., a number of seconds, minutes, hours, days, or the like).

For example, in some embodiments, user power use data can be obtained by one or more battery systems 300 of a battery network 500, with such data being stored at one or more of the battery systems 300, a battery server 510 and user device 520. Such data can include time and duration of one or more power use sessions, the identity of a load source associated with such a power use session, a type of power use session (e.g., cooking dinner, cooking breakfast, running a dishwasher, washing clothes, drying clothes, watching television, playing a video game console, operating a computer, heating a home, cooling a home, or the like), and efficiency or issues associated with such a power use session (e.g., running out of power, not being able to output sufficient power to meet demand, and the like). Additionally, such data can include information about power consumed by one or more batteries 305 of one or more battery systems 300, power consumed from a grid energy source 110, power consumed from a solar energy source, and the like.

Power cost data can be obtained from various suitable sources, such as directly via a public or private utility server or a server that collects data from multiple sources that provide energy cost data (e.g., a battery server 510). Such data can include real-time changes in energy cost, scheduled changes in cost based on time of day, day of the week, season, or the like. Such power cost data can be relevant to the location of where a given battery system 300, powered building system 100, or the like is located (e.g., data that effects the cost of power consumed where such a battery system 300 and/or powered building system 100 is located). Additionally, power cost data in some embodiments can include a price that will be paid for energy provided to the grid 110, which can include real-time, time-of-day, day-of-the-week, and seasonal prices.

In various embodiments, a user power profile can be associated with one or more powered building system 100, and can comprise data at a building-level, battery system level 300, battery-level, load source level, or the like. For example, a power profile can comprise a location of a building 105, location of and type(s) of battery systems 300 in the building 105, along with real-time and historical data on power used, stored or provided by one or more batteries 305, load source 200, battery system 300, grid power source 110, solar power source 115, or the like. As discussed herein, such data can include data regarding power use along with health, capacity, and the like of one or more batteries 305, battery system 300, load source 200, solar energy source 115, grid power source 110, or the like. Such a user power profile can be stored in various suitable locations, including at one or more battery systems 300, a battery server 510, a user device 520, or the like.

Figure 6B:
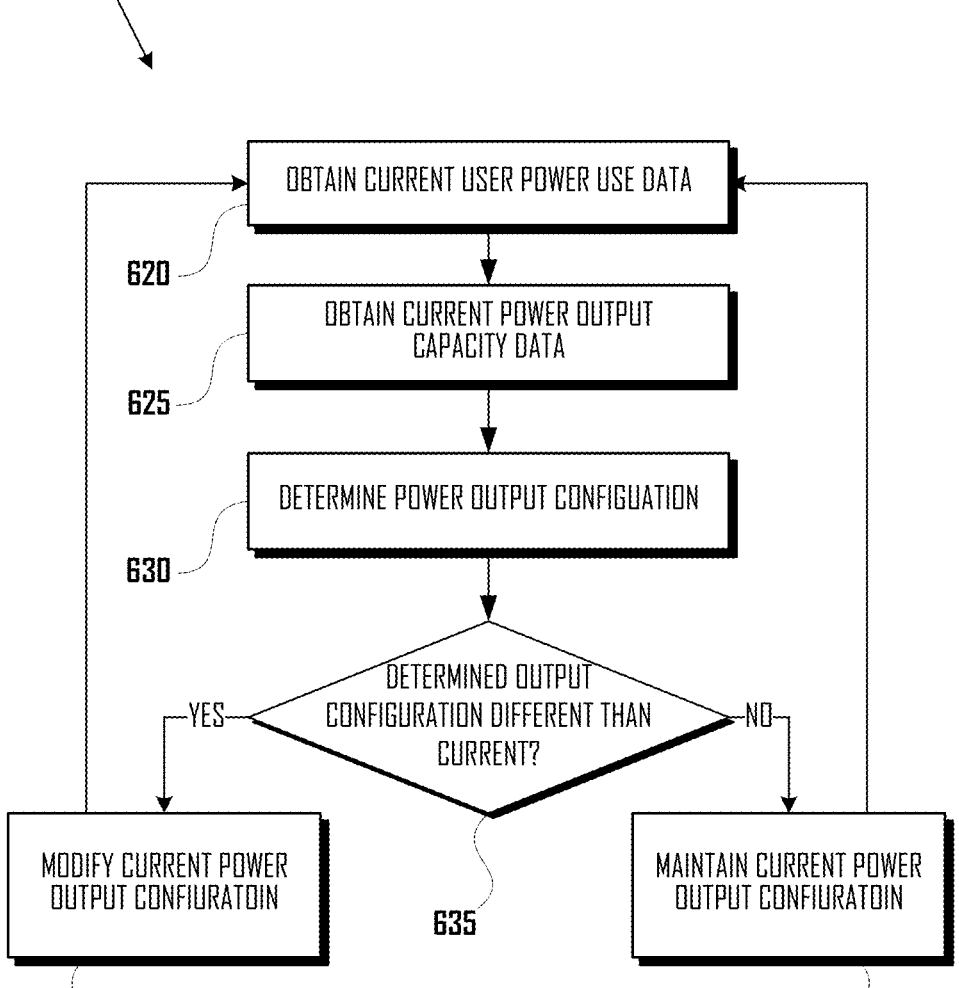
FIG. 6b illustrates an example method of determining a power output configuration.

Turning to FIG. 6b, an example method 601 of determining a power output configuration is illustrated, which includes block 620 where current power use data is obtained, and block 625 where current power output capacity data is obtained. At block 630, a power output configuration is determined, and at 635, a determination is made whether the determined power output configuration is different than a current power output configuration. If so, at 640, the current power output configuration is modified (e.g., to the determined output configuration). However, if not, the current power output configuration is maintained at 645. The method 601 returns to 620 regardless of whether a current power output configuration is changed or modified, which can allow for monitoring of whether a change in a power configuration is necessary, desirable, or the like. Such monitoring can be in real-time or periodically at various suitable intervals (e.g., a number of seconds, minutes, hours, days, or the like).

In some embodiments, such a method 601 can be performed by one or more battery systems 300 individually and/or separately or can be performed by one or more battery systems 300, user device 520 or battery server 510 to configure one or more battery systems 300. For example, using FIG. 5 for purposes of illustration, in some embodiments, each of the battery systems 300A, 300B, 300C can individually control its own configuration (e.g., via the method 601) and/or one or more of the battery systems can be configured by another device (e.g., another battery system 300, the battery server 510, the user device 520, or the like). In other words, in some embodiments, individual battery systems 300 can be self-controlled and/or a set of battery systems 300 can be controlled individually or as a group by another device or one of the battery systems 300 (e.g., a primary battery system 300). Accordingly, power use data and power output capacity data can be obtained from a plurality of battery systems 300 or from a single battery system 300, which may or may not include communication of such data via a network (e.g., network 530).

Determining an output configuration can be for various suitable purposes, such as to maximize use of renewable energy sources (e.g., solar panels 115); to maximize storage of power from renewable energy sources; to maximize storage of power from a power grid 110 when such power is at a low or lower cost; to maximize performance of a load source 200; to maximize energy efficiency of a load source; to maximize energy storage by one or more batteries 305; to minimize charging time for one or more batteries 305; and the like. For instance, a shorter nighttime cooking session can be completely covered in some examples by an on-board or associated battery 305, charged during the day with ample solar resources, while a longer, more demanding nighttime cooking session could be powered jointly by the battery 305 and low-capacity outlet (e.g., receptacle 165). In this way, the charge and discharge control laws of the system and/or network can maximize the use of renewable-generated electricity, in some examples, without impacting the experience of the user.

In various embodiments, batteries 305 of one or more battery systems 300 need not be sized to completely cover a load shift for an appliance (e.g., 24 hours) to be effective at increasing renewable energy coverage or for other suitable purposes. Based on the statistics of energy use, a small decrease in allocated battery capacity can significantly increase the average utilization, while only minimally increasing power draw during off-peak generation hours.

Figure 7:
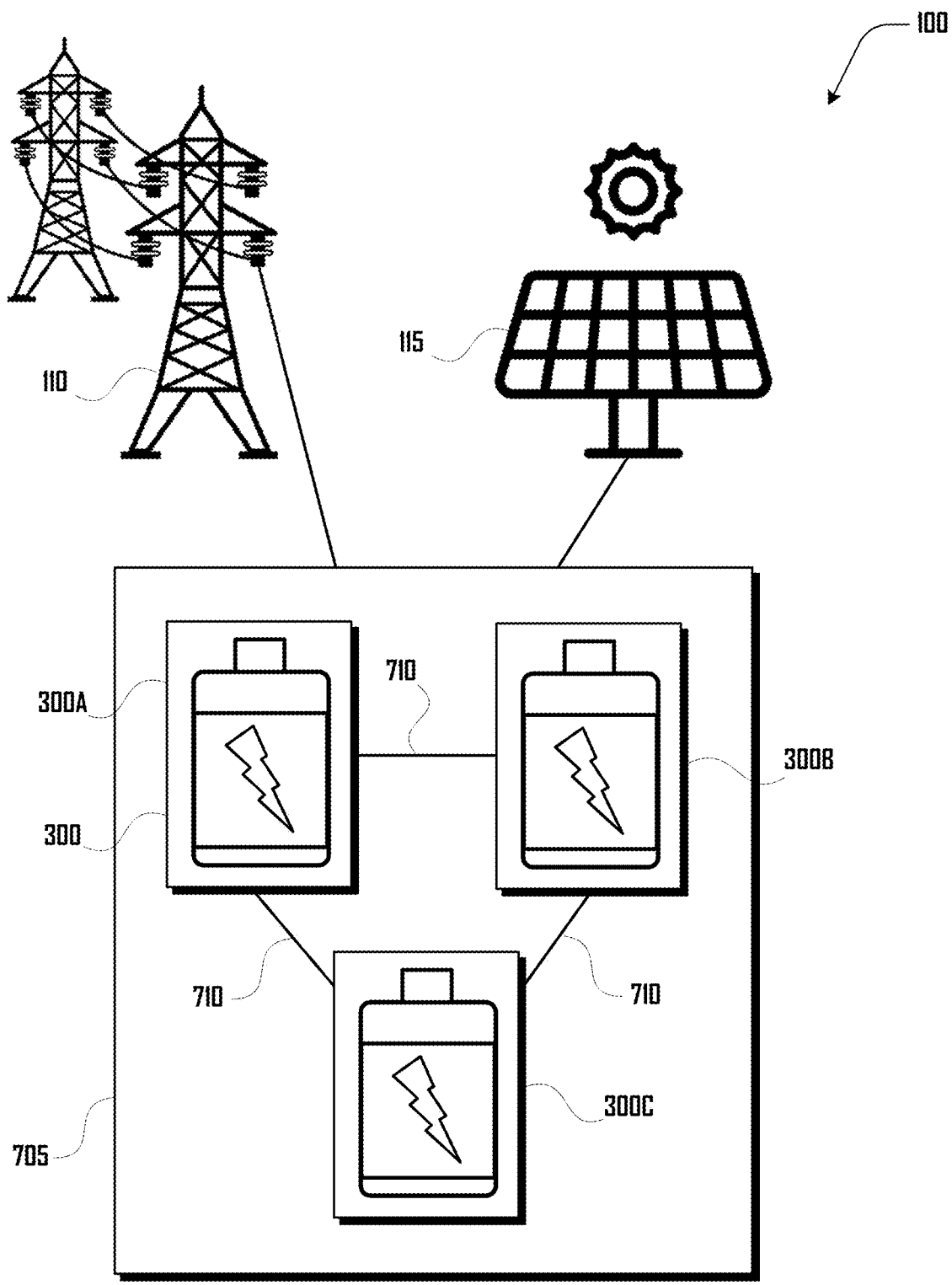
FIG. 7 illustrates an embodiment of a powered building system that comprises a battery system set comprising three battery systems, which are configured to share power via a plurality of power sharing lines.

While various embodiments include a single battery 305 and/or battery system 300 serving a single load source 200, in further embodiments a given battery 305 and/or battery system 300 can provide power to more than load source 200 or can provide power to one or more other batteries 305 and/or battery systems 300. For example, FIG. 7 illustrates an embodiment of a powered building system 100 that comprises a battery system set 705 comprising three battery systems 300A, 300B, 300C, which are configured to share power via a plurality of power sharing lines 710. In some embodiments, some or all of the power sharing lines can be mono or bi-directional. For example, in some embodiments, the first battery system 300A can provide power to the second and third battery systems 300B, 300C and the first battery system 300A can receive power from the second and third battery systems 300B, 300C. However, in some embodiments, the first battery system 300A can provide power to the second and third battery systems 300B, 300C but the first battery system 300A can only receive power directly from the second battery system 300B (but not from the third battery system 300C). However, in various embodiments, even if a given battery system 300 cannot receive power directly from another specific battery system 300, it may be configured to receive power from that battery system indirectly via another battery system 300.

Sharing of power between battery systems 300 via power sharing lines 710 can be done in various suitable ways including in-wall, bi-directional power sharing lines 710 or via power lines extending between battery systems in other suitable ways such as through a room, in or on a ceiling, in or on HVAC elements, in or under a floor, in or under the ground, or the like.

In various embodiments, edge storage can enable strategies for load sharing between appliances, including the use of bi-directional power converters at the plug, as well as dedicated wired connections. For example, during a Thanksgiving marathon cooking session, the clothes dryer battery capacity (e.g., a battery system 300A associated with a clothes dryer) can be called on to supplement that of the stove (e.g., via a battery system 300B associated with the stove). Additionally, battery capacity from other sources can be drawn if necessary, such as battery capacity from a water heater (e.g., a battery system 300C associated with the water heater), being drawn to further supply the stove and/or to power the clothes dryer later in the night if power from the battery system 300A of the clothes dryer has been depleted and it is undesirable to use power from the grid 110 or if renewable energy (e.g., from solar panels 115) is not available based on the time of day or conditions.

Control of power sharing within a battery system set 705 can be done in various suitable ways. For example, in some embodiments, a plurality of battery systems 300 can act as separate equal nodes and can negotiate amongst themselves for sharing of power. In further embodiments, one battery system 300 of the battery system set 705 can be a dominant battery system 300 and control power sharing and/or power sharing and be controlled by another device such as a battery server 510, user device 520, or the like.

Figure 8:
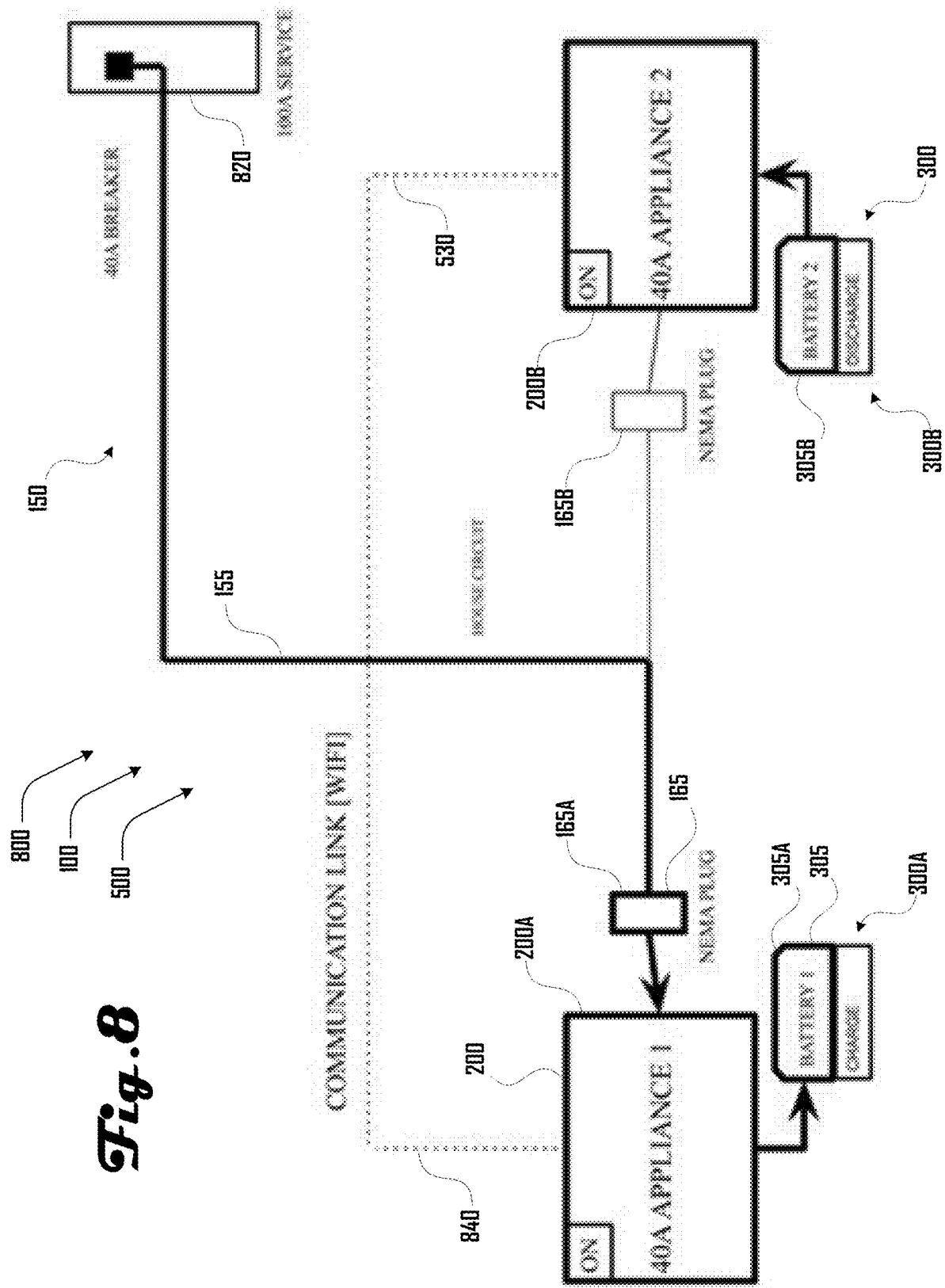
FIG. 8 illustrates a first state of an example embodiment where the first load source is drawing power from the circuit breaker via the first receptacle with the first battery of the first battery system being charged by power from the circuit breaker.
Figure 9:
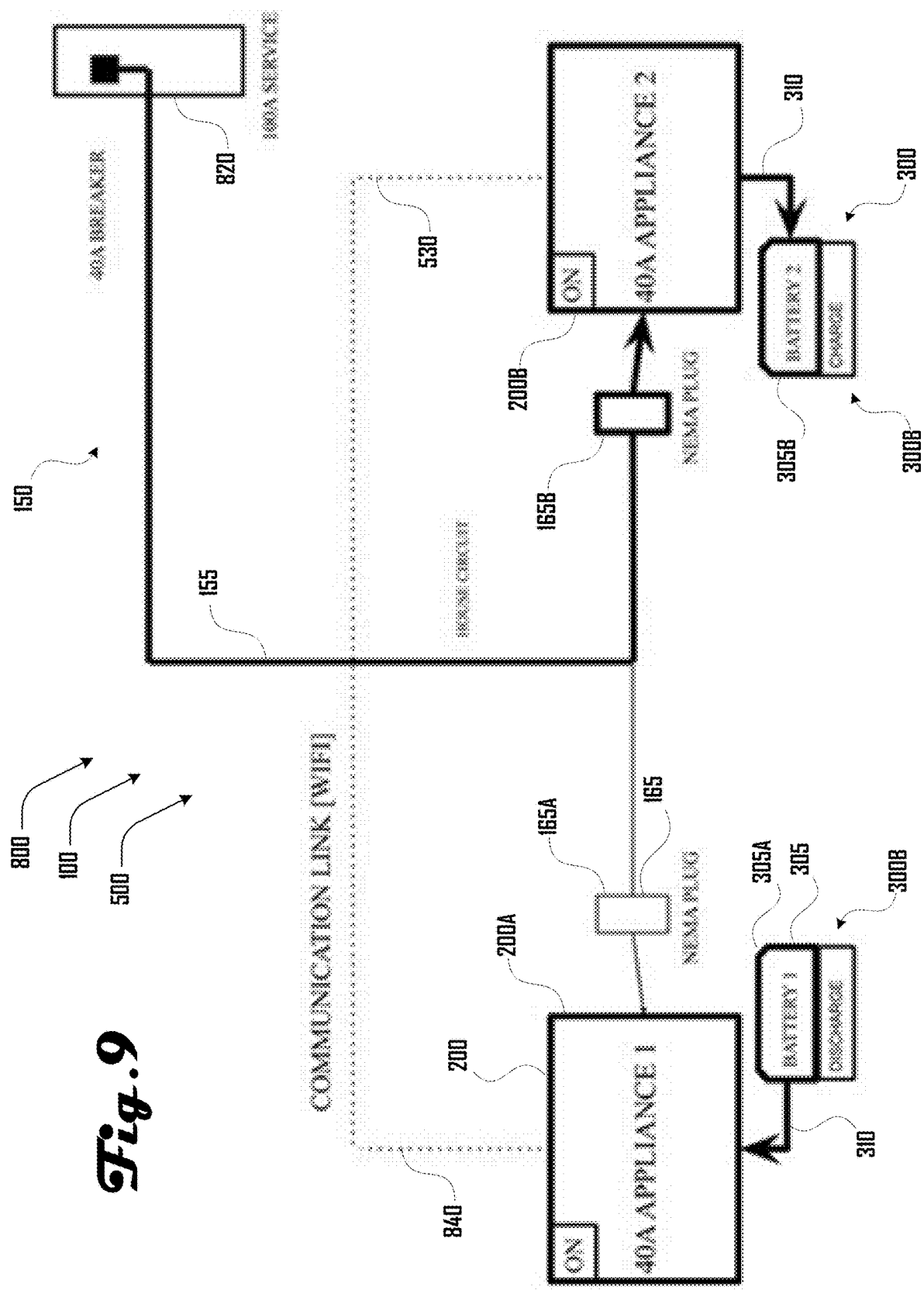
FIG. 9 illustrates a second state of the example embodiment where the second load source is drawing power from the circuit breaker via the second receptacle with the second battery of the second battery system being charged by power from the circuit breaker.

In some embodiments, batteries 305 along with battery systems 300 can be used to allow load sources 200 (e.g., appliances) to share a single breaker. This could be a 120 v 15 amp circuit or a 208 v/240 v 30/40/50 amp circuit in some embodiments. For example, FIGS. 8 and 9 illustrate an example embodiment 800 of a powered building system 100 and battery network 500 that includes a power distribution system 150 that comprises a 40 A breaker 820 associated with a 100 A service that transmits power to a first and second receptacle 165A, 165B via a power line 155. First and second load sources 200A, 200B are coupled with the respective receptacles 165A, 165B. The first and second load sources 200A, 200B are associated with respective first and second battery systems 300A, 300B comprising respective batteries 305A, 305B that are configured to provide power to and receive power from the load sources 200A, 200B. The battery systems 300A, 300B may be a part of the first and second load sources 200A, 200B (see e.g., FIG. 3a); however, other configurations can be present in further embodiments (see e.g., FIGS. 3b and 3c).

In some embodiments, a control algorithm can use various factors such as charge state, expected demand, potential TOU savings, and other suitable factors to determine an optimal or suitable time for each appliance 200 to use the circuit 820, while ensuring in some examples that at no time would both appliances 200 draw power from the shared circuit 820 at the same time (e.g., to keep the current draw always below the max rated for the breaker 820, the safe use of the wiring, that allowed by relevant codes, or the like).

In various embodiments use of the circuit 820 can be negotiated by the battery systems 300A, 300B as peers, controlled by a dominant battery system 300, controlled by a battery server 510, user device 520, or the like. In some embodiments, the battery systems 300A, 300B (and/or load sources 200A, 200B) can communicate with each other or other devices (e.g., battery server 510 or user device 520) via a network 530, such as a Wi-Fi network as shown in the non-limiting example of FIGS. 8 and 9.

For example, FIG. 8 illustrates a first state of the example embodiment 800 where the first load source 200A is drawing power from the circuit breaker 820 via the first receptacle 165A with the first battery 305A of the first battery system 300A being charged by power from the circuit breaker 820. In contrast, the second load source 200B is not drawing power from the circuit breaker 820 via the second receptacle 165B with the second battery 305B of the second battery system 300B discharging power to power the second load source 200B.

FIG. 9 illustrates a second state of the example embodiment 800 where the second load source 200B is drawing power from the circuit breaker 820 via the second receptacle 165B with the second battery 305B of the second battery system 300B being charged by power from the circuit breaker 820. In contrast, the first load source 200A is not drawing power from the circuit breaker 820 via the first receptacle 165A, with the first battery 305A of the first battery system 300A discharging power to power the first load source 200A.

Along with allowing multiple load sources 200 (e.g., appliances) to utilize the same circuit 155 and breaker 820, such a battery system control method in some embodiments can allow the addition/use of electrical appliances that would otherwise require a full-service upgrade (e.g., an increase in the allowable current passed through a household main electrical panel). In various embodiments, any suitable number of appliances 200 can utilize the same household circuits at different times to power their operation or charge their batteries 305, while the batteries 305 allow for the simultaneous use of the appliances 200 and the control switches can prevent them from ever simultaneously using the household circuits in some embodiments.

Figure 13:
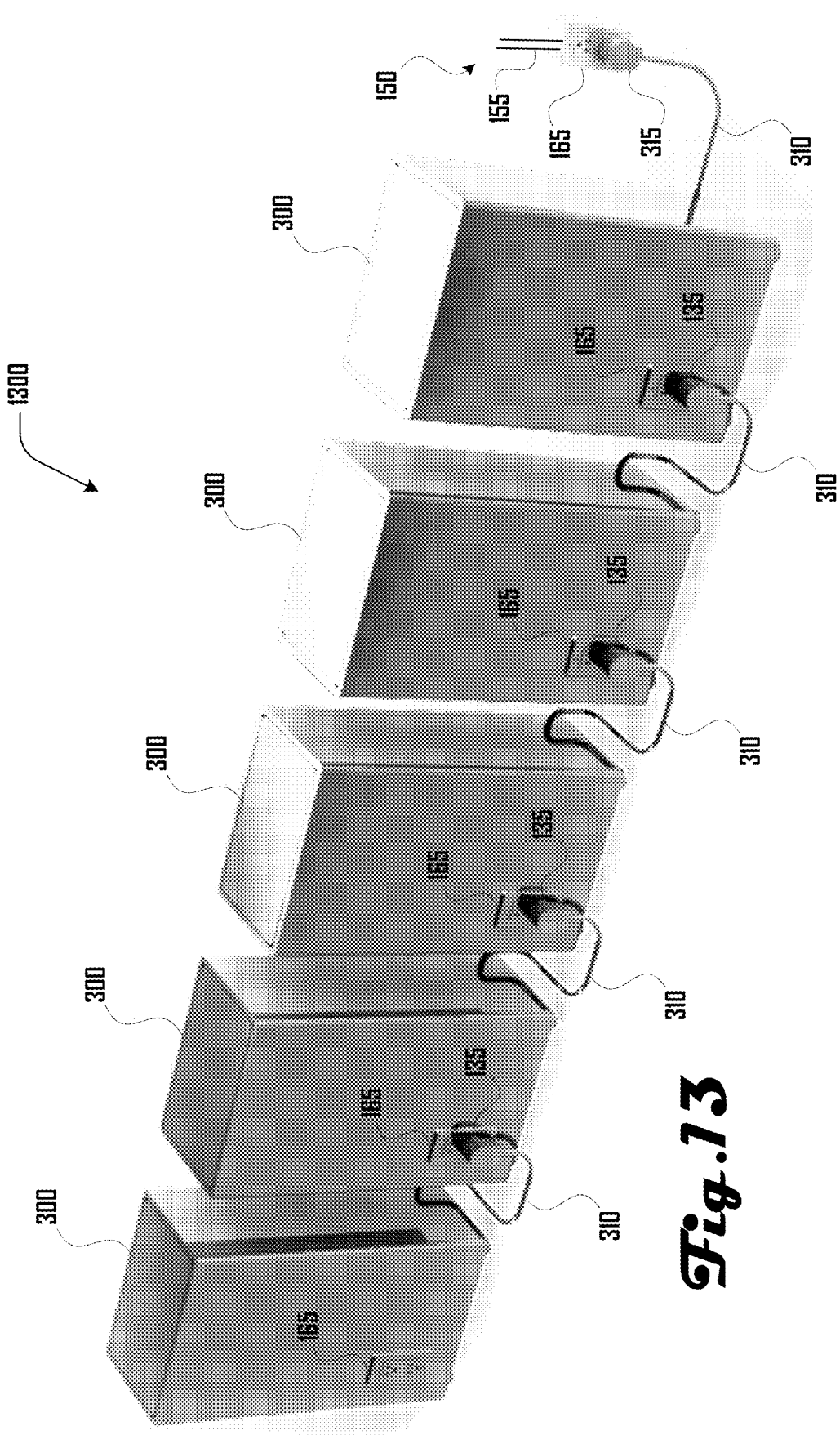
FIG. 13 illustrates an example embodiment of a plurality of battery systems connected in series and at least receiving electrical power from a power distribution system by one of the battery systems being plugged into a receptacle of the power distribution system.
Figure 14:
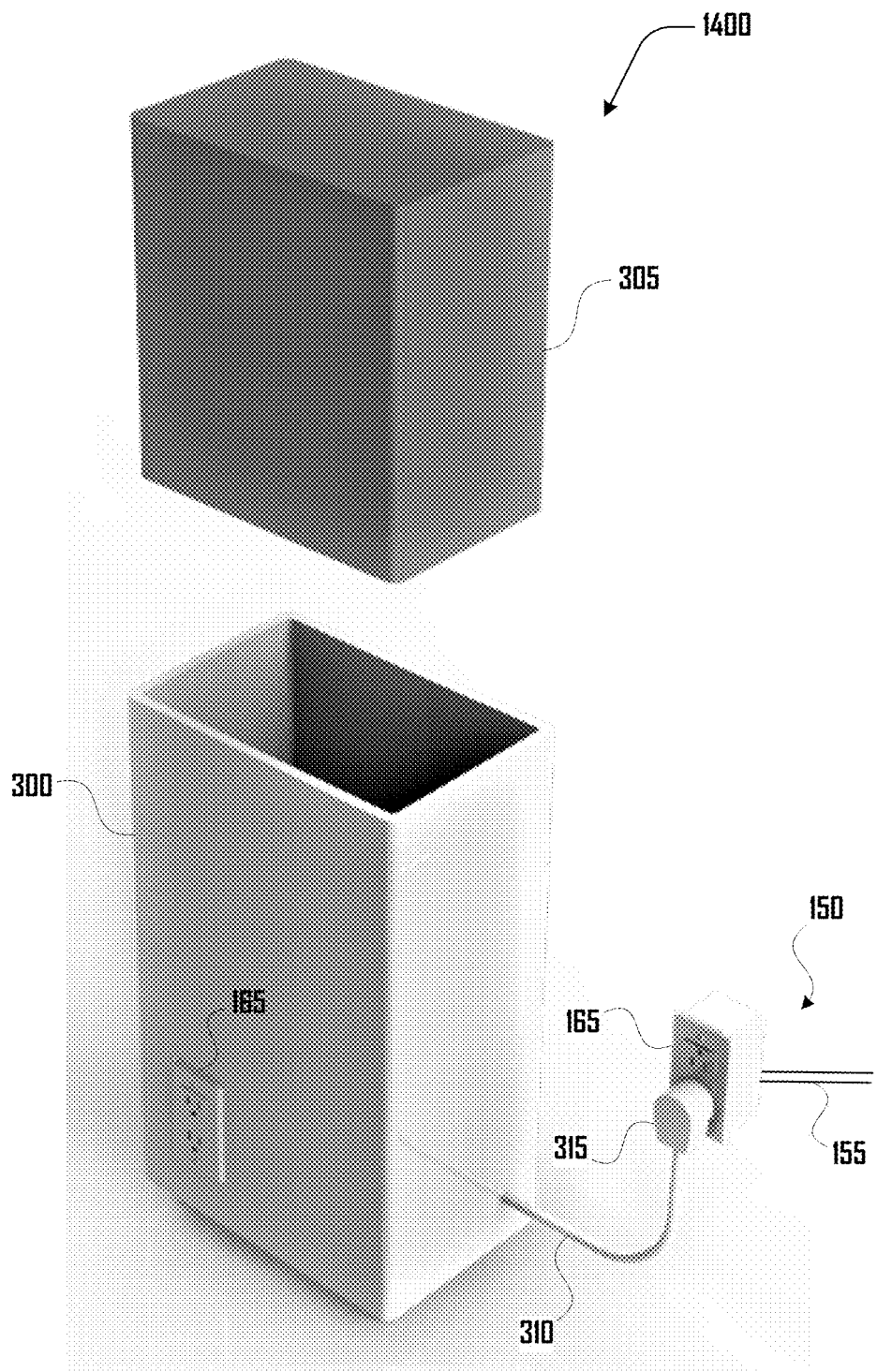
FIG. 14 illustrates an example of a battery system as shown in FIG. 13, which can include a removable modular battery.

In various embodiments, batteries 305 and/or battery systems 300 can be plugged into one another to scale. Additionally, in various examples, a powered building system 100 or battery network 500 is not limited in size and new nodes, storage/load combinations, and the like, can be added without disruptions to the network or system. This can be done in various examples through a shared network protocol that allows for network growth. For example, FIG. 13 illustrates an example embodiment 1300 of a plurality of battery systems 300 connected in series and at least receiving electrical power from a power distribution system 150 by one of the battery systems 300 being plugged into a receptacle 165 of the power distribution system 150. In some embodiments, the battery systems 300 can provide power to load sources 200 or other suitable devices in various suitable ways. FIG. 14 illustrates an example of a battery system 300 as shown in FIG. 13, which can include a removable modular battery 305.

In various embodiments, a fully scalable network of batteries 305 and/or battery systems 300 allows for small networks to be developed, individually grown, joined partially or temporarily with others, or combined fully to form larger networks. Battery networks 500 and/or powered building systems 100 of various embodiments can be created and controlled by individuals within a shared living situation. For example, an individual that owns several networked battery appliances may move into a room within a shared housing situation. This individual can choose to join their network with others in the house to form a larger network, allowing the connected batteries 305 and/or battery systems 300 to communicate over a shared wireless network and/or through the electrical network already installed into the house or building (e.g., via a network 530 of FIG. 50). The appliances in various examples can then share power, share constrained circuit space without overloading it, and otherwise optimize the electrical loads of the household.

In various embodiments, different power networks associated with different users in a shared living, working or operating environment can allow power costs and/or credits to be apportioned to each given user. For example, power consumed by each user's load sources can be tracked along with shared or overhead load sources 200, and along with credit for power generated by renewable energy sources (e.g., solar panels 115) provided to or used by power networks of other users.

These networks can then be joined to form even larger networks, such as that of an entire apartment building, neighborhood, school, university, or town. Network protocols in various examples can allow for the sharing and optimization of storage, while maintaining an understanding of ownership and allowing for the trading of electrical power as in a normal market.

A second potential risk of this approach in some examples can be effectively managing the thermal requirements of the batteries in the context of the appliance. Due to the high-energy density, thermal runaway of lithium batteries can be a safety concern and should be prevented in various examples. Additionally, on a less catastrophic level, operating batteries at elevated temperatures can impact lifetime. Because of these factors, battery management systems can have integrated temperature sensing and thermal interlocking. Accordingly, various embodiments can comprise such battery management systems along with careful thermal design to isolate battery compartments from regions of the appliance or local environment with unsafe operating temperatures. For instance, an effective design strategy for thermal management in various embodiments is building high aspect ratio packs adjacent to the ambient environment. An additional strategy can be to incorporate fire suppression at the appliance level in the individual battery systems 300. For example, in some embodiments a battery system 300 can include a fire suppression system that comprises sensors operable to determine whether a fire is occurring in the battery, and if so, execute fire-suppression measures such as releasing foam, liquid, gas, generating a vacuum, or the like to extinguish the fire.

A third potential risk involves obtaining adequate safety certifications to place batteries directly into appliances and obtaining sufficient buy-in from appliance manufacturers to adopt this technology. Mitigation strategies may include one or more of the following. First, some embodiments can include data analytics and software modeling to estimate the most effective appliance targets and quantify value propositions. For instance, some examples can include localized estimates of the value per watt-hour capacity for each appliance based on time-of-use electricity prices, grid scale and distributed renewables enabled, and avoided electrical upgrade costs. Second, some embodiments can include hardware units which can sit between an existing appliance and the electrical outlet, before integrating with appliances. These hardware units can verify the value proposition in terms of achievable demand response under real-world use, as well as test robustness of the hardware, networking, and control electronics and can be used in place of appliances with integrated batteries, along with appliances with integrated batteries, with conventional appliances before replacement with a battery-integrated appliance, and the like. Third, various embodiments can include safety certifications through UL or another body, as well as green certifications through the nascent ENERGY STAR Connected Functionality program or similar.

In many instantiations (see e.g., FIG. 3*a*), the battery can reside within the appliance itself, whether a stove, refrigerator, HVAC system, clothes washer, clothes dryer, TV, game machines, tools, bbq, lighting, lawnmower, grass blower, vacuum cleaner, blender, juicer, food processor, basement freezer, speakers, audio equipment, cooling fans, or other appliances. These batteries, in some examples, may be factory installed and integrated directly with the control electronics of the appliance. In other instantiations, the battery may be placed between the appliance and its power source (see e.g., FIG. 3*c*). Examples of this form can include a generic "extension cord" or "power strip" with storage built in which enables this as a retrofit for appliances. Other examples can include a generic "within wall plug" with power storage facilities (see e.g., FIG. 3*b*). This can be or be in place of the plug or receptacle typically installed in your wall between the studs behind drywall. For example, in one embodiment, there can be about 50 of these battery receptacles in a house, and at equal to or greater than 1 kWh each would cover nearly all power storage requirements of the house.

In various embodiments, control schemes of such appliances may operate in several modes including one or more of the following examples. First, such appliances may effectively share loads between a wall plug and a battery based on estimated usage requirements without impeding user experience. This scheme may be used in some examples to maximize the energy used from a solar installation or other alternative energy source, or to enable the use of high-capacity devices running from a 110 v socket, or enable the use of time-of-use electricity rates. Another control scheme may operate when the appliance is not in use, nor expected to be in use in the near future, where the appliance provides energy arbitrage services, which can enable a house to absorb and store cheap electricity from the grid for later use.

In some examples, battery integrated appliances can coordinate through networking to minimize peak power draw on a whole-house level. This can be through wireless networking (e.g., 802.11 or mesh networking) or wired (e.g., Ethernet). Fourth, in some examples, battery integrated appliances can enable load sharing between appliances, either through external wiring (AC, low voltage DC, PoE, etc.) or through existing wiring. Existing wiring can be used in some examples by adding an air-gap switch in plug boxes that can isolate a run of wiring from the circuit breaker and changes/runs DC over it. Power can also be transferred over existing wiring with DC-shifted AC.

In various embodiments, control schemes for battery integrated appliances may function using several levels of data including one or more of the following examples. First, they may rely only on calendar and time of day to predict loads and supply. Second, they may incorporate historical use data to tailor the algorithms to the habits of the user. Third, they may report data back to a central system where it is aggregated and used to provide control laws. Fourth, it may accept user input to switch control modes (for instance, a user can press a button to prepare the stove to cook a large meal, during which it will pre-charge to full capacity and/or load share between the battery and plug during operation). Fifth, they may use data about electricity rates (e.g., time-of-use rates) from the utility to tailor control laws to use the cheapest electricity from the grid. Sixth, they may use data from a rooftop solar array to predict and maximize the use of available solar electricity.

Additional benefits may be provided to the appliances by the batteries in accordance with further embodiments. For example, many conventional appliances have performance limited by the peak power provided by the wall outlet. The batteries can allow for much higher peak powers, which can be used to increase performance of appliances. For instance, induction stoves can have extremely fast temperature ramp up, higher peak outputs, and lower noise. On demand water heating can have higher capacity, enabling storage-free water heaters with higher outputs. Electric kettles can be made to boil faster. For devices with motors, these motors can be run with higher peak powers, and if desired, at voltages more optimal than the AC from the wall. In some cases, the battery thermal management can be synergistic with the appliance performance. For instance, the heat from the battery pack can boost the coefficient of performance of heat pump devices like electric dryers.

With a home electric system, many costs can be proportional to peak power. Installing batteries at end uses can decrease peak power, and hence decrease these costs. By enabling hybrid AC/DC systems, battery integrated appliances may also enable the use of higher efficiency solid state power conversion, including inverters and DC/DC voltage conversion.

Battery integrated appliances of various embodiments can provide fire retardant capabilities, to protect against thermal runaway of lithium batteries, and can include a fire alarm to warn of an emergency. Further device health monitoring may also be incorporated to monitor the state of health of the battery pack. This can be implemented through capacity monitoring, internal resistance measurements, or impedance spectroscopy. Such devices may also be made waterproof to protect batteries and electronics. These devices can also provide voltage regulation services for the house electrical system.

In various embodiments, a battery can allow high-power appliances to be usable with 110 receptacle as opposed to having to install 220. In some examples, batteries can have 4-24 hours of storage.

Some embodiments can obtain real-time or historical use data for a room, house, building, block, city, state, and the like.

In various examples, it can be beneficial to minimize inversions (e.g., inverter in battery module that sits on DC bus can prevent multiple inversions).

Some embodiments can have power sharing between appliances (e.g., via extension cords, existing or new in-wall wiring, Ethernet, and the like).

Some embodiments can have battery module in other locations such as in a wall receptacle, between wall receptacle and appliance, and the like.

Some examples can include suggestions to user on where to place a battery module.

Some examples can have a battery module that is integral or replaceable within the appliance. Such a battery module can be configured to be a self-contained unit that is waterproof, heatproof, and the like, and can provide for shallow cycling of battery, fire suppression, battery monitoring, and the like. The whole module, including control systems, may be a replaceable unit since control systems may be inexpensive compared to the battery.

The battery module in various examples can obtain and use different types of data to control battery use. This can depend on network connectivity or complexity of the system. A simple battery module can simply include a clock and lookup table with the battery module operating based on time, day, season, or the like. Another more complex version can store use history from only the battery module itself or local battery modules and use a clock to control battery operation. Another more complex version can have network connectivity (e.g., to the Internet), which can provide access to data from an electrical grid, use data from remote modules, etc.

Various embodiments can be configured to forecast use based on data discussed above, or the like. Some embodiments can be configured to operate based on user input (e.g., user indicates he is about to or will cook a meal at a later time or date). Forecasting can be based on data such as user calendars, user defined schedules, or the like.

In some examples, a house can operate as a hybrid AC/DC bus.

Receptacles 165 can have air-gap breakers in some embodiments and various devices can turn receptacles on/off (e.g., a battery system 300 coupled with the receptacle 165; a battery system 300 not coupled with the receptacle 165; a battery server 510; a user device 520; or the like). Such control of air-gap breakers can be via wired and/or wireless communication (e.g., network 530).

Some devices can have large ramp-up requirements and having a local battery 305 can reduce this, resulting in faster, better appliances (e.g., faster heating). Appliances can be configured to dial up voltages as necessary to provide for improved appliances. Other benefits can include electrostatics in washer/dryer, quieter operation from supersonic induction, increased efficiency of inverters, and the like.

While specific examples are discussed herein, these examples should not be construed to be limiting on the wide variety of alternative and additional embodiments that are within the scope and spirit of the present disclosure. For example, appliances, devices or systems that can be associated with one or more batteries as discussed herein can include one or more of the examples in the table below. Also, while residential examples are the focus of some examples herein, further embodiments can include multi-family buildings, commercial buildings, vehicles, or the like.

| Appliance | Watts |
|---|---|
| Kitchen | |
| Blender | 500 |
| Can Opener | 150 |
| Coffee Machine | 1000 |
| Dishwasher | 1200-1500 |
| Espresso Machine | 800 |
| Freezer - Upright - 15 cu. ft. | 1240 Wh/Day** |
| Freezer - Chest - 15 cu. ft. | 1080 Wh/Day** |
| Fridge - 20 cu. ft. (AC) | 1411 Wh/day** |
| Fridge -16 cu. ft. (AC) | 1200 Wh/day** |
| Garbage Disposal | 450 |
| Kettle - Electric | 1200 |

-continued

| Appliance | Watts |
|---|---|
| Microwave | 1000 |
| Oven - Electric | 1200 |
| Toaster | 850 |
| Toaster Oven | 1200 |
| Stand Mixer | 300 |
| Heating/Cooling | |
| Box Fan | 200 |
| Ceiling Fan | 120 |
| Central Air Conditioner - 24,000 BTU NA | 3800 |
| Central Air Conditioner - 10,000 BTU NA | 3250 |
| Furnace Fan Blower | 800 |
| Space Heater NA | 1500 |
| Tankless Water Heater - Electric | 18000 |
| Water Heater - Electric | 4500 |
| Window Air Conditioner 10,000 BTU NA | 900 |
| Window Air Conditioner 12,000 BTU NA | 3250 |
| Well Pump - ⅓ 1 HP | 750 |
| Laundry | |
| Clothes Dryer - Electric | 3000 |
| Clothes Dryer - Gas | 1800 |
| Clothes Washer | 800 |
| Iron | 1200 |
| Living Room | |
| Blu-ray Player | 15 |
| Cable Box | 35 |
| DVD Player | 15 |
| TV - LCD | 150 |
| TV - Plasma | 200 |
| Satellite Dish | 25 |
| Stereo Receiver | 450 |
| Video Game Console | 150 |
| Lights | |
| CFL Bulb - 40 Watt Equivalent | 11 |
| CFL Bulb - 60 Watt Equivalent | 18 |
| CFL Bulb - 75 Watt Equivalent | 20 |
| CFL Bulb - 100 Watt Equivalent | 30 |
| Compact Fluorescent 20 Watt | 22 |
| Compact Fluorescent 25 Watt | 28 |
| Halogen - 40 Watt | 40 |
| Incandescent 50 Watt | 50 |
| Incandescent 100 Watt | 100 |
| LED Bulb - 40 Watt Equivalent | 10 |
| LED Bulb - 60 Watt Equivalent | 13 |
| LED Bulb - 75 watt equivalent | 18 |
| LED Bulb - 100 Watt Equivalent | 23 |
| Office | |
| Desktop Computer (Standard) | 200 |
| Desktop Computer (Gaming) | 500 |
| Laptop | 100 |
| LCD Monitor | 100 |
| Modem | 7 |
| Paper Shredder | 150 |
| Printer | 100 |
| Router | 7 |
| Smart Phone - Recharge | 6 |
| Tablet - Recharge | 8 |
| Tools | |
| Band Saw - 14" | 1100 |
| Belt Sander - 3" | 1000 |
| Chain Saw - 12" | 1100 |
| Circular Saw - 7¼" | 900 |
| Circular Saw 8¼" | 1400 |
| Disc Sander - 9" | 1200 |
| Drill - ¼" | 250 |
| Drill - ½" | 750 |
| Drill - 1" | 1000 |
| Hedge Trimmer | 450 |
| Weed Eater | 500 |

-continued

| Appliance | Watts |
|---|---|
| Misc. | |
| Clock Radio | 7 |
| Curling Iron | 150 |
| Dehumidifier | 280 |
| Electric Shaver | 15 |
| Electric Blanket | 200 |
| Hair Dryer | 1500 |
| Humidifier | 200 |
| Radiotelephone - Receive | 5 |
| Radiotelephone - Transmit | 75 |
| Sewing Machine | 100 |
| Vacuum | 1000 |

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown in some embodiments can be explicitly absent from further embodiments. Accordingly, the recitation of an element being present in one example should be construed to support some embodiments where such an element is explicitly absent.

What is claimed is:

1. A powered building system comprising:
a building having an electric power distribution system that receives electrical power from an electrical grid and/or one or more solar panels, the electrical power distribution system comprising a plurality power lines running through walls of the building that distribute electrical power about the building to a plurality of receptacles at different locations about the building;
a plurality of load sources disposed at the different locations about the building, the load sources comprising one or more of a heat pump, an electric stove, a refrigerator, and a water heater; and
a plurality of battery systems disposed at the different locations about the building, with each of the battery systems associated with a different respective receptacle of the plurality of receptacles and respectively with one of the load sources, the plurality of battery systems including:
a first battery system that is an integral component of and disposed within a housing of a first load source of the plurality of load sources, the first load source comprising a first power cord plugged into a first receptacle of the plurality of receptacles, the first battery system comprising a first battery configured to obtain and store power from the first receptacle, the first load source being configured to be fully powered by power stored by the first battery and configured to be fully powered by power obtained from the first receptacle and configured to be partially powered by both the first battery and power obtained from the first receptacle;
a second battery system that includes a second battery and a second receptacle of the plurality of receptacles, the second battery system disposed within a wall of the building, with a second load source comprising a second power cord plugged into the second receptacle of the plurality of receptacles, with the second battery configured to obtain and store power from the electrical power distribution system, the second load source being configured to be fully powered by power stored by the second battery and configured to be fully powered by power obtained from the electrical power distribution system and configured to be partially powered by both the second battery and power obtained from the electrical power distribution system; and a third battery system electrically disposed between a third load source and a third receptacle of the plurality of receptacles, the third battery system comprising a third electrical power cord plugged into the third receptacle, with the third load source comprising a fourth power cord plugged into a fourth receptacle of the third load source, the third battery system comprising a third battery configured to obtain and store power from the third receptacle, the third load source being configured to be fully powered by power stored by the third battery and configured to be fully powered by power obtained from the third receptacle via the third battery system and configured to be partially powered by both the third battery and power obtained from the third receptacle via the third battery system;

wherein the first, second and third battery systems each further comprise:
a processor,
a memory,
a battery control system,
an interface, and
an electrical power bus.

2. The powered building system of claim 1, wherein the first, second and third battery systems each further comprise a communication system configured to allow the first, second and third battery systems to:
communicate with each other via a wireless network;
communicate with a remote battery server; and
communicate with at least one user device.

3. The powered building system of claim 1, wherein the first, second and third battery systems are configured to share stored electrical power with each other via the electrical power distribution system, including:
the first battery configured to provide stored power to the second and third battery systems;
the second battery configured to provide stored power to the first and third battery systems; and
the third battery configured to provide stored power to the first and second battery systems.

4. The powered building system of claim 1, wherein the battery control systems of the first, second and third battery systems are each configured to:
obtain current power use data associated with the respective load source associated with the battery system;
obtain current power output capacity of the respective battery of the battery system;
determine a new power output configuration that prioritizes use and storage of energy from the one or more solar panels over use of power from the electrical grid; and
replace a current power output configuration with the new power output configuration to:
stop use of power from the electrical grid, and
cause storage of power obtained from the one or more solar panels at the battery of the battery system and/or cause the load source associated with the battery system to be powered by power obtained from the one or more solar panels.

5. A powered building system comprising:
a building having an electric power distribution system that receives electrical power from an electrical grid and one or more renewable power sources, the electric power distribution system distributing electrical power about the building to a plurality of receptacles at different locations about the building;
a plurality of load sources disposed at the different locations about the building; and
a plurality of battery systems disposed at the different locations about the building, with each of the battery systems associated with a different respective receptacle of the plurality of receptacles and respectively with one of the load sources,
wherein the plurality of battery systems include:
a first battery system that is an integral component of and disposed within a housing of a first load source of the plurality of load sources, the first load source comprising a first power cord plugged into a first receptacle of the plurality of receptacles, the first battery system comprising a first battery configured to obtain and store power from the first receptacle, the first load source being configured to be fully powered by power stored by the first battery and configured to be fully powered by power obtained from the first receptacle and configured to be partially powered by both the first battery and power obtained from the first receptacle.

6. A powered building system comprising:
a building having an electric power distribution system that receives electrical power from an electrical grid and one or more renewable power sources, the electric power distribution system distributing electrical power about the building to a plurality of receptacles at different locations about the building;
a plurality of load sources disposed at the different locations about the building; and
a plurality of battery systems disposed at the different locations about the building, with each of the battery systems associated with a different respective receptacle of the plurality of receptacles and respectively with one of the load sources,
wherein the plurality of battery systems include:
a first battery system that includes a first battery and a first receptacle of the plurality of receptacles, the first battery system disposed within a wall of the building, with a first load source comprising a first power cord plugged into the first receptacle of the plurality of receptacles, with the first battery configured to obtain and store power from the electrical power distribution system, the first load source being configured to be fully powered by power stored by the first battery and configured to be fully powered by power obtained from the electrical power distribution system and configured to be partially powered by both the first battery and power obtained from the electrical power distribution system.

7. The powered building system of claim 5, wherein the plurality of battery systems include:
a first battery system electrically disposed between a first load source and a first receptacle of the plurality of receptacles, the first battery system comprising a first electrical power cord plugged into the first receptacle, with the first load source comprising a second power cord plugged into a fourth receptacle of the first load source, the first battery system comprising a first battery configured to obtain and store power from the first receptacle, the first load source being configured to be fully powered by power stored by the first battery and configured to be fully powered by power obtained from the first receptacle via the first battery system and configured to be partially powered by both the first battery and power obtained from the first receptacle via the first battery system.

8. The powered building system of claim 5, wherein each of the plurality of battery systems comprise:
a battery,
a processor,
a memory,
a battery control system,
an interface, and
an electrical power bus.

9. The powered building system of claim 5, wherein the battery systems each further comprise a communication system configured to allow the battery systems to communicate with each other via a wireless network.

10. A powered building system comprising:
a building having an electric power distribution system that receives electrical power from an electrical grid and one or more renewable power sources, the electric power distribution system distributing electrical power about the building to a plurality of receptacles at different locations about the building;
a plurality of load sources disposed at the different locations about the building; and
a plurality of battery systems disposed at the different locations about the building, with each of the battery systems associated with a different respective receptacle of the plurality of receptacles and respectively with one of the load sources,
wherein the plurality of battery systems comprise a first, second and third battery system that are configured to share stored electrical power with each other via the electrical power distribution system, including:
a first battery of the first battery system configured to provide stored power to the second and third battery systems;
a second battery of the second battery system configured to provide stored power to the first and third battery systems; and
a third battery of the third battery system configured to provide stored power to the first and second battery systems.

11. A powered building system comprising:
a building having an electric power distribution system that receives electrical power from an electrical grid and one or more renewable power sources, the electric power distribution system distributing electrical power about the building to a plurality of receptacles at different locations about the building;
a plurality of load sources disposed at the different locations about the building; and
a plurality of battery systems disposed at the different locations about the building, with each of the battery systems associated with a different respective receptacle of the plurality of receptacles and respectively with one of the load sources,
wherein at least one battery system of the plurality of battery systems is configured to:
obtain current power use data associated with a load source associated with the at least one battery system;
obtain current power output capacity of a battery of the at least one battery system;
determine a new power output configuration that prioritizes use and storage of energy from the one or more renewable energy sources over use of power from the electrical grid; and
replace a current power output configuration with the new power output configuration to:
stop use of power from the electrical grid, and
cause storage of power obtained from at least one of the one or more renewable energy sources at the battery of the at least one battery system and/or cause the load source associated with the at least one battery system to be powered by power obtained from the at least one of the one or more renewable energy sources.

12. A powered building system comprising:
an electric power distribution system configured to distribute electrical power to a plurality of receptacles;
one or more load sources; and
one or more battery systems associated with:
a respective receptacle of the plurality of receptacles, and
a respective load source of the one or more load sources,
wherein the one or more battery systems include:
a first battery system that is disposed within a first load source of the one or more load sources, the first load source comprising a first power cord plugged into a first receptacle of the plurality of receptacles, the first battery system comprising a first battery configured to obtain and store power from the first receptacle, the first load source being configured to be fully powered by power stored by the first battery and configured to be fully powered by power obtained from the first receptacle and configured to be partially powered by both the first battery and power obtained from the first receptacle.

13. A powered building system comprising:
an electric power distribution system configured to distribute electrical power to a plurality of receptacles;
one or more load sources; and
one or more battery systems associated with:
a respective receptacle of the plurality of receptacles, and
a respective load source of the one or more load sources,
wherein the one or more battery systems include:
a first battery system that includes a first battery and a first receptacle of the plurality of receptacles, the first battery system disposed within a wall of a building, with a first load source comprising a first power cord plugged into the first receptacle of the plurality of receptacles, with the first battery configured to obtain and store power from the electrical power distribution system, the first load source being configured to be fully powered by power stored by the first battery and configured to be fully powered by power obtained from the electrical power distribution system and configured to be partially powered by both the first battery and power obtained from the electrical power distribution system.

14. The powered building system of claim 12, wherein the one or more battery systems include:
a first battery system comprising a first electrical power cord plugged into the first receptacle, with the first load source comprising a second power cord plugged into a fourth receptacle of the first load source, the first battery system comprising a first battery configured to obtain and store power from the first receptacle, the first load source being configured to be fully powered by power stored by the first battery and configured to be fully powered by power obtained from the first receptacle via the first battery system and configured to be partially powered by both the first battery and power obtained from the first receptacle via the first battery system.

15. The powered building system of claim 12, wherein the one or more battery systems comprises a plurality of battery systems that each comprise a communication system configured to allow the plurality of battery systems to communicate with each other via a network.

16. The powered building system of claim 12, wherein the one or more battery systems comprise a first and second battery system that are configured to share stored electrical power with each other, including:
   a first battery of the first battery system configured to provide stored power to the second battery system; and
   a second battery of the second battery system configured to provide stored power to the first battery system.

17. The powered building system of claim 12, wherein at least one battery system of the one or more battery systems is configured to:
   change a power output configuration of the at least one battery system to:
      stop use of power from an electrical grid, and
      cause storage of power obtained from a renewable energy source at a battery of the at least one battery system and/or cause the load source associated with the at least one battery system to be powered by power obtained from a renewable energy source.

* * * * *